United States Patent
Okamoto et al.

(10) Patent No.: US 10,017,673 B2
(45) Date of Patent: Jul. 10, 2018

(54) POLYMER FINE PARTICLE-CONTAINING CURABLE RESIN COMPOSITION HAVING IMPROVED BONDING STRENGTH AGAINST IMPACT PEELING

(71) Applicant: Kaneka Corporation, Osaka (JP)

(72) Inventors: Toshihiko Okamoto, Hyogo (JP); Shohei Nishimori, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 15/564,890

(22) PCT Filed: Apr. 8, 2016

(86) PCT No.: PCT/JP2016/061474
§ 371 (c)(1),
(2) Date: Oct. 6, 2017

(87) PCT Pub. No.: WO2016/163491
PCT Pub. Date: Oct. 13, 2016

(65) Prior Publication Data
US 2018/0094176 A1  Apr. 5, 2018

(30) Foreign Application Priority Data
Apr. 9, 2015 (JP) ................................. 2015-080397

(51) Int. Cl.
| | |
|---|---|
| *C08L 51/00* | (2006.01) |
| *C09J 163/00* | (2006.01) |
| *C09J 11/08* | (2006.01) |
| *C09J 175/08* | (2006.01) |
| *C08G 18/58* | (2006.01) |
| *C08L 51/04* | (2006.01) |
| *C08G 59/62* | (2006.01) |
| *C08G 18/80* | (2006.01) |
| *C08L 63/00* | (2006.01) |

(52) U.S. Cl.
CPC ............ *C09J 163/00* (2013.01); *C08G 18/58* (2013.01); *C08G 18/80* (2013.01); *C08G 59/62* (2013.01); *C08L 51/04* (2013.01); *C08L 63/00* (2013.01); *C09J 11/08* (2013.01); *C09J 175/08* (2013.01)

(58) Field of Classification Search
CPC ........ C08G 18/58; C08G 18/80; C08G 59/62; C08L 51/04; C08L 63/00; C08J 11/08
See application file for complete search history.

(56) References Cited

U.S. PATENT DOCUMENTS

| | | | |
|---|---|---|---|
| 7,919,555 B2* | 4/2011 | Agarwal | C08L 51/04 524/500 |
| 2008/0188609 A1 | 8/2008 | Agarwal et al. | |
| 2010/0204404 A1 | 8/2010 | Hongo | |
| 2010/0273005 A1 | 10/2010 | Kramer et al. | |
| 2012/0103517 A1* | 5/2012 | Eagle | C08G 59/066 156/330 |
| 2013/0263995 A1 | 10/2013 | Lutz et al. | |
| 2016/0017192 A1 | 1/2016 | Lutz et al. | |
| 2016/0122539 A1* | 5/2016 | Okamoto | C08J 5/04 428/319.7 |
| 2016/0244603 A1 | 8/2016 | Okamoto | |
| 2016/0251510 A1* | 9/2016 | Furukawa | C08F 279/02 523/201 |

FOREIGN PATENT DOCUMENTS

| | | |
|---|---|---|
| JP | 2009-506169 A | 2/2009 |
| JP | 2013-224440 A | 10/2013 |
| JP | 2014-505761 A | 3/2014 |
| WO | 2009/014037 A1 | 1/2009 |
| WO | 2009/034966 A1 | 3/2009 |
| WO | 2014/196607 A1 | 12/2014 |
| WO | 2015/064561 A1 | 5/2015 |

OTHER PUBLICATIONS

International Search Report issued in PCT/JP2016/061474 dated Jun. 28, 2016 (2 pages).
Written Opinion of the International Searching Authority issued in PCT/JP2016/061474 dated Jun. 28, 2016 (7 pages).

* cited by examiner

*Primary Examiner* — Hannah J Pak
(74) *Attorney, Agent, or Firm* — Osha Liang LLP

(57) ABSTRACT

The present invention relates to a curable resin composition containing 100 parts by mass of an epoxy resin (A), 1 to 100 parts by mass of polymer fine particles (B), and 1 to 100 parts by mass of a blocked urethane (C), wherein the polymer fine particles have a core-shell structure of a core layer and a shell layer, the core layer contains diene rubber, the shell layer contains at least a hydroxyl group, and the content of the hydroxyl group of the polymer fine particles (B) is 0.01 to 0.8 mmol/g.

18 Claims, No Drawings

POLYMER FINE PARTICLE-CONTAINING CURABLE RESIN COMPOSITION HAVING IMPROVED BONDING STRENGTH AGAINST IMPACT PEELING

TECHNICAL FIELD

The present invention relates to a curable resin composition containing as a main component an epoxy resin having excellent impact peel-resistant adhesion.

BACKGROUND ART

A cured product of the epoxy resin has excellent properties such as size stability, mechanical strength, electrical insulation, heat resistance, water resistance, chemical resistance and the like. However, there are problems that the cured product of the epoxy resin has a very fragile property such as a small fracture toughness, and problems are produced by this property in a wide application in some cases.

Patent Document 1 discloses a technique that polymer fine particles having a core-shell structure are dispersed in a curable resin composition containing as a main component a curable resin such as an epoxy resin.

An adhesive containing the epoxy resin composition having toughness and impact resistance has been used as a structure adhesive for vehicle, and particularly, impact peel-resistant adhesion described in ISO11343 is considered to be important, so that the improvement of impact peel-resistant adhesion has been required in the curable resin composition. In addition, Patent Documents 2 and 3 disclose techniques that polymer fine particles having a core-shell structure in which a core layer contains diene rubber and a shell layer contains at least hydroxyl group are dispersed in a curable resin composition containing as a main component a polyol using in the formation of polyurethane and the like.

In addition, Patent Document 4 discloses that polymer fine particles having a core-shell structure and a strengthening agent other than polymer fine particles having the core shell structure are compounded to an adhesive composition containing as a main component an epoxy resin to improve impact peel-resistant adhesion.

PRIOR ART DOCUMENTS

Patent Document

Patent Document 1: WO2009/034966
Patent Document 2: WO2014/196607
Patent Document 3: WO2009/014037
Patent document 4: JP2009-506169

SUMMARY OF THE INVENTION

Problems to be Solved by the Invention

However, techniques of Patent Documents 2 and 3 containing polymer fine particles, a polyol, and a polyisocyanate are essentially different from the technique of Patent Document 4 containing as a main component an epoxy resin.

In addition, Patent Document 4 discloses that core-shell polymer fine particles preferably have as a polymer constituting a shell layer a functional group capable of chemically reacting with an epoxy resin and an epoxy curing agent in an adhesive composition. Also, Patent Document 4 discloses various functional groups such as an epoxy group, a hydroxyl group, an amine group, an amide group, a carboxyl group and the like, and discloses as a strengthening agent other than core-shell polymer fine particles various strengthening agents such as rubber modified epoxy resin, blocked urethane, and urethane modified epoxy resin. However, in Patent Document 4, there is no disclosure that a given functional group of the shell layer is preferably combined with a given strengthening agent and there is no suggestion that the combination of the functional group of the shell layer and the strengthening agent improves impact peel-resistant adhesion. Further, Patent Document 4 discloses no idea for designing a curable resin composition that a chemical bond of a functional group (hydroxyl group) of the shell layer of the core-shell polymer fine particles and a strengthening agent (blocked urethane) is utilized.

In the curable resin composition containing the epoxy resin, the polymer fine particles and the blocked urethane, the present inventors have found that impact peel-resistant adhesion (for example resistance to dynamic peeling) is changed according to a component (particularly a hydroxyl group) for constituting the shell layer of the polymer fine particles and an amount of the component, to study the shell layer of the polymer fine particles.

The object of the present invention is to provide a curable resin composition containing as a main component an epoxy resin and having excellent impact peel-resistant adhesion of the cured product.

The another object of the present invention is to provide a curable resin composition capable of preventing an increase of a viscosity of the curable resin composition and having excellent impact peel-resistant adhesion of the cured product.

Solutions to the Problems

In the curable resin composition containing an epoxy resin (A), polymer fine particles (B) having a core-shell structure and a core layer of diene rubber, and a strengthening agent other than polymer fine particles (B), the present inventors have found that the above-mentioned objects are solved by combining polymer fine particles having a hydroxyl group of 0.01 to 0.8 mmol/g (preferably 0.01 to 0.4 mmol/g) in the shell layer with blocked urethane (C) as the strengthening agent other than the polymer fine particles (B), to complete the present invention.

Specifically, the gist of the present invention is as follows.
[1] A curable resin composition containing 100 parts by mass of an epoxy resin (A), 1 to 100 parts by mass of polymer fine particles (B), and 1 to 100 parts by mass of a blocked urethane (C), wherein the polymer fine particles have a core-shell structure of a core layer and a shell layer, the core layer contains diene rubber, the shell layer contains at least a hydroxyl group, and the content of the hydroxyl group of the polymer fine particles (B) is 0.01 to 0.8 mmol/g.
[2] The curable resin composition according to [1], wherein the polymer fine particles (B) have the shell layer graft-polymerized on the core layer, and the shell layer is polymerized with a monomer having a hydroxyl group and at least one monomer selected from the group consisting of an aromatic vinyl monomer, a vinyl cyanide monomer, and a (meth) acrylate monomer.
[3] The curable resin composition according to [1] or [2], wherein the diene rubber is butadiene rubber and/or butadiene-styrene rubber.
[4] The curable resin composition according to any one of [1] to [3], wherein the blocked urethane (C) contains a compound including a urethane prepolymer having a polyalkylene glycol structure capped with a blocking agent.

[5] The curable resin composition according to any one of [1] to [4], wherein a mass ratio of polymer fine particles (B) to blocked urethane (C) is 0.2 to 5.
[6] The curable resin composition according to any one of [1] to [5], wherein the epoxy resin (A) contains a reactive diluent of a polyepoxide, and the amount of the reactive diluent is 0.5 to 20% by mass per 100% by mass of the epoxy resin (A).
[7] The curable resin composition according to any one of [1] to [6], wherein the content of the hydroxyl group of the polymer fine particles (B) is 0.01 to 0.4 mmol/g.
[8] The curable resin composition according to any one of [1] to [7], wherein an epoxy curing agent (D) is contained in an amount of 1 to 80 parts by mass per 100 parts by mass of the epoxy resin (A).
[9] The curable resin composition according to any one of [1] to [8], wherein a curing accelerator (E) is contained in an amount of 0.1 to 10 parts by mass per 100 parts by mass of the epoxy resin (A).
[10] The curable resin composition according to any one of [1] to [9], wherein the polymer fine particles (B) are dispersed at a state of primary particles in the curable resin composition.
[11] The curable resin composition according to any one of [1] to [10], wherein dynamic resistance to cleavage is more than 19 kN/m after curing the curable resin composition.
[12] A cured product obtained by curing the curable resin composition as defined in any one of [1] to [11].
[13] A one pack curable resin composition as defined in any one of [1] to [11].
[14] A structural adhesive obtained by containing the curable resin composition as defined in any one of [1] to [11].

Effects of the Invention

The curable resin composition of the present invention can improve impact peel-resistant adhesion of the cured product. In addition, it is preferable that an increase of a viscosity of the curable resin composition can be prevented and impact peel-resistant adhesion of the cured product can be improved.

MODE FOR CARRYING OUT THE INVENTION

Hereinafter, the curable resin composition of the present invention is explained in detail.
The curable resin composition of the present invention contains 100 parts by mass of an epoxy resin (A), 1 to 100 parts by mass of polymer fine particles (B), and 1 to 100 parts by mass of a blocked urethane (C), wherein the polymer fine particles have a core-shell structure of a core layer and a shell layer, the core layer contains diene rubber, the shell layer contains at least a hydroxyl group, and the content of the hydroxyl group is 0.01 to 0.8 mmol/g of the polymer fine particles (B).
Hereinafter, the epoxy resin (A), the polymer fine particles (B), and the blocked urethane (C) may be represented by a component (A), a component (B), and a component (C), respectively.
<Epoxy Resin (A)>
The epoxy resin (A) is used as a major component of the curable resin composition of the present invention. As the epoxy resin, various hard epoxy resins can be used except rubber modified epoxy resin and urethane modified epoxy resin as set forth below.
Examples thereof include a bisphenol A epoxy resin, a bisphenol F epoxy resin, a bisphenol AD epoxy resin, a bisphenol S epoxy resin, a glycidyl ester epoxy resin, a glycidyl amine epoxy resin, a novolac epoxy resin, a glycidyl ether epoxy resin of a bisphenol A propylene oxide adduct, a hydrogenated bisphenol A (or F) epoxy resin, a fluorinated epoxy resin, flame-retardant epoxy resins such as a glycidyl ether of tetrabromobisphenol A, a p-hydroxybenzoic acid glycidyl ether ester epoxy resin, an m-aminophenol epoxy resin, a diaminodiphenylmethane epoxy resin, alicyclic epoxy resins, N,N-diglycidylaniline, N,N-diglycidyl-o-toluidine, triglycidyl isocyanurate, divinylbenzene dioxide, resorcinol diglycidyl ether, polyalkylene glycol diglycidyl ether, glycol diglycidyl ether, diglycidyl esters of aliphatic polybasic acids, glycidyl ethers of polyhydric aliphatic alcohols such as glycerol, a chelate-modified epoxy resin, a hydantoin epoxy resin, epoxidized unsaturated polymers such as a petroleum resin, an amino-containing glycidyl ether resin, and epoxy compounds obtained by making a bisphenol A (or F), a polybasic acid, or the like undergo an addition reaction with the above-mentioned epoxy resins. However, the epoxy resin is not limited to the above-mentioned epoxy resins, and epoxy resins commonly used may be used.
The polyalkylene glycol diglycidyl ether includes polyethylene glycol diglycidyl ether, polypropylene glycol diglycidyl ether and the like. The glycol diglycidyl ether concretely includes neopentyl glycol diglycidyl ether, 1,4-butanediol diglycidyl ether, 1,6-hexanediol diglycidyl ether, cyclohexane dimethanol diglycidyl ether and the like. The diglycidyl ester of the aliphatic polybasic acid includes diglycidyl ester of dimer acid, diglycidyl ester of adipic acid, diglycidyl ester of sebacic acid, diglycidyl ester of maleic acid. The glycidyl ether of polyvalent aliphatic alcohol includes trimethylol propane triglycidyl ether, trimethylol ethane triglycidyl ether, caster oil modified polyglycidyl ether, propoxylated glycerin triglycidyl ether, sorbitol polyglycidyl ether and the like. An epoxy compound obtained from the addition reaction of polybasic acid and the like to an epoxy resin as described in WO 2010/098950 includes addition reaction products of the dimmer of talloil fatty acid (dimmer acid) and bisphenol A epoxy resin. These epoxy resins can be used individually or in the combination of two or more kinds.
In addition, the polyalkylene glycol diglycidyl ether, the glycol diglycidyl ether, the diglycidyl ester of aliphatic polybasic acid, the glycidyl ether of polyvalent aliphatic alcohol are epoxy resins having relatively lower viscosity, and serve as a reactive diluent in the case where these are used with other epoxy resins such as bisphenol A epoxy resin and bisphenol F epoxy resin. Then, the balance between the viscosity of the composition and the physical property of the cured product can be improved. That is, the epoxy resin (A) preferably contains the reactive diluent of the polyepoxide. On the other hand, a monoepoxide serves as the reactive diluent as set forth below, and is not contained in the epoxy resin (A). The amount of the reactive diluent (reactive diluent of polyepoxide) is preferably 0.5 to 20% by mass, more preferably 1 to 10% by mass, and even preferably 2 to 5% by mass of 100% by mass of the epoxy resin (A).
Among these, the reactive diluent of the polyepoxide is preferably polyalkylene glycol diglycidyl ether or glycol diglycidyl ether, more preferably polyethylene glycol diglycidyl ether, polypropylene glycol diglycidyl ether, 1,4-butanediol diglycidyl ether, 1,6-hexanediol diglycidyl ether, and even preferably polypropylene glycol diglycidyl ether, 1,6-hexanediol diglycidyl ether.
The chelate-modified epoxy resin is a reaction product of the epoxy resin and a compound containing a chelate functional group (chelate ligand). In the case of adding the chelate-modified epoxy resin to the curable resin composition of the present invention to use as an adhesive for vehicle, adhesiveness to the surface of the metal material polluted with oily substances can be improved. The chelate functional group is a functional group of a compound having multiple coordinations capable of chelating with metal ions in a molecule, and includes an acid group containing phosphorus (for example, —PO(OH)$_2$), a carboxyl group (—CO$_2$H), an acid group containing sulfur (for example, —SO$_3$H), an amino group and a hydroxyl group (particularly, hydroxyl groups neighboring each other in an aromatic ring) and the like. The chelate ligand includes ethylenediamine, bipyridine, ethylenediamine tetraacetic acid, phenanthroline, porphyrin, crown ether and the like. A commercially available chelate-modified epoxy resin includes adeka resin EP-49-10N manufactured by ADEKA CORPORATION and the like.

The amount of the chelate-modified epoxy resin is preferably 0.1 to 10% by mass, and more preferably 0.5 to 3% by mass per 100% by mass of the epoxy resin (A). Among these epoxy resins, the epoxy resin having at least two epoxy groups in a molecule is preferable because three dimensional networks are easily introduced in the cured product due to high reactivity during the cure.

Among the epoxy resins, bisphenol A epoxy resin and bisphenol F epoxy resin are preferable, and bisphenol A epoxy resin is particularly preferable due to high elastic modulus of the cured product obtained, excellent heat resistance and adhesiveness, and relatively low cost.

In addition, among various epoxy resins, the epoxy resin has preferably the epoxy equivalent of less than 220, more preferably the epoxy equivalent of 90 or more and 210 or less, and even preferably the epoxy equivalent of 150 or more and 200 or less in the view of the high elastic modulus and heat resistance of the cured product obtained.

Particularly, bisphenol A epoxy resin and bisphenol F epoxy resin having the epoxy equivalent of less than 220 are preferable because these are liquid in an ambient temperature and the handling of the obtained curable resin composition is good.

Bisphenol A epoxy resin and bisphenol F epoxy resin having the epoxy equivalent of 220 or more and less than 5000 are contained in the amount of preferably 40% by mass or less, more preferably 20% by mass or less of 100% by mass of the epoxy resin (A) in the view of excellent impact resistance of the cured products obtained. On the contrary, the viscosity of the composition is increased, and the workability is deteriorated in some cases.

<Polymer Fine Particle (B)>

The curable resin composition of the present invention uses 1 to 100 parts by mass of polymer fine particles (B) having a core-shell structure of a core layer and a shell layer, the core layer contains diene rubber and the shell layer contains a hydroxyl group of 0.01 to 0.8 mmol/g relative to 100 parts by mass of the epoxy resin (A). The cured product obtained has excellent toughness and impact peel-resistant adhesion from effects of improving toughness of the polymer fine particle (B).

The core layer of the polymer fine particles (B) is diene rubber having lower affinity with the epoxy resin (A), and the increase of the viscosity from the swelling of the core layer in the epoxy resin is not found with time. In addition, the core layer is diene rubber, so that the impact peel-resistant adhesion of the cured product is higher compared with that using polymer fine particles having polysiloxane rubber or acrylic rubber. Further, when combining the polymer fine particles (B) having the hydroxyl group in the shell layer and the blocked urethane (C), the impact peel-resistant adhesion of the cured product is remarkably improved because of a chemical bond of the hydroxyl group of the polymer fine particles (B) with an isocyanate group formed by releasing the blocking agent of the blocked urethane (C).

When the content of the hydroxyl group of the polymer fine particles (B), preferably the content of the hydroxyl group of the shell layer of the polymer fine particles (B) is 0.01 to 0.8 mmol/g, the cured product having excellent impact peel-resistant adhesion can be obtained. In the case where the content of the hydroxyl group of the polymer fine particles is less than 0.01 mmol/g, the cured product obtained has a tendency to decrease the impact peel-resistant adhesion. In the case where the content of the hydroxyl group of the polymer fine particles is more than 0.8 mmol/g, the composition after storage has a tendency to increase the viscosity and the handling of the composition has a tendency to become difficult.

The content of the hydroxyl group of the polymer fine particles (B) is 0.01 to 0.8 mmol/g, preferably 0.02 to 0.6 mmol/g, more preferably 0.03 to 0.5 mmol/g, even preferably 0.04 to 0.4 mmol/g, and particularly preferably 0.05 to 0.3 mmol/g in the viewpoint of the impact peel-resistant adhesion of the cured product obtained and the easy handling of the curable resin composition.

The amount of the polymer fine particles (B) is 1 to 100 parts by mass, preferably 2 to 70 parts by mass, more preferably 3 to 50 parts by mass, even preferably 3 to 30 parts by mass, and even more preferably 4 to 20 parts by mass per 100 parts by mass of the epoxy resin (A), from the balance between the easy handling of the curable resin composition obtained and effects of improving toughness of the cured product obtained.

The particle diameter of the polymer fine particles is not particularly limited, and the volume average particle diameter (Mv) of the polymer fine particles is preferably 10 to 2000 nm, more preferably 30 to 600 nm, further preferably 50 to 400 nm, even more preferably 50 to 300 nm, and especially preferably 100 to 200 nm in the view of industrial productivity. The volume average particle diameter of the polymer fine particles can be measured by using Microtrack UPA 150 (manufactured by Nikkiso Co., Ltd.).

In the composition of the present invention, the polymer fine particles (B) preferably have half value width of 0.5 times or more and 1 time or less the number average particle diameter in the number particle size distribution, because the curable resin composition obtained has lower viscosity and is handled easily.

The polymer fine particles (B) have preferably the maximal of two or more in the number particle size distribution in the view of easily realizing a given particle size distribution, more preferably the maximal of two or three, and further preferably the maximal of two in the view of the work and cost during manufacture. Especially, it is preferable that the polymer fine particles (B) contain polymer fine particles having the volume average particle diameter of not less than 10 nm and less than 150 nm in an amount of 10 to 90% by mass and polymer fine particles having the volume average particle diameter of not less than 150 nm and not more than 2000 nm in an amount of 90 to 10% by mass.

It is preferable that the polymer fine particles (B) are dispersed at the state of the primary particle in the curable resin composition. In the present invention, "the polymer fine particles are dispersed at the state of the primary particle in the curable resin composition" (hereinafter referred to as primary dispersion in some cases) mean that the polymer fine particles are substantially dispersed individually (without contacting each other). The dispersion state of the polymer fine particles can be confirmed by dissolving a part of the curable resin composition in a solvent such as methylethylketone, and measuring the particle diameter by using a particle diameter measuring device with laser beam scattering and the like.

The value of the volume average particle diameter (Mv)/the number average particle diameter (Mn) as the particle diameter measurement is not particularly limited, and the value of the volume average particle diameter (Mv)/the number average particle diameter (Mn) is preferably 3 or less, more preferably 2.5 or less, even preferably 2 or less, and particularly preferably 1.5 or less. In the case where the value of the volume average particle diameter (Mv)/the number average particle diameter (Mn) is 3 or less, the polymer fine particles are favorably dispersed. On the other hand, the curable resin composition having the particle size distribution of more than 3 has lower physical properties such as the impact resistance and adhesiveness of the cured product obtained in some cases.

The volume average particle diameter (Mv)/the number average particle diameter (Mn) can be measured by using Microtrack UPA (manufactured by Nikkiso Co., Ltd.), and dividing My by Mn.

"Stable dispersion" of the polymer fine particles means that the polymer fine particles are dispersed for a long period under general conditions without aggregating, separating and precipitating in the continuous layer. Preferably, the distribution of the polymer fine particles substantially does not change in the continuous layer, and "stable dispersion" can be maintained even when the composition containing the polymer fine particles is heated in the range of no danger so as to stir the composition and lower the viscosity of the composition. The polymer fine particles (B) may be used individually or in combination of two or more kinds.

The structure of the polymer fine particle (B) is not limited particularly, but the polymer fine particle (B) preferably has the core-shell structure of two or more layers. In addition, the polymer fine particle (B) can have a structure having three or more layers comprising a core layer, an intermediate layer coated on the core layer, and a shell layer coated on the intermediate layer.

Hereinafter, each layer of the polymer fine particle is concretely explained.

<<Core Layer>>

The core layer is preferably an elastic core layer having a rubber property in order to improve toughness of the cured material from the curable resin composition of the present invention. For the rubber property, the elastic core layer of the present invention has the gel content of preferably not less than 60% by mass, more preferably not less than 80% by mass, further preferably not less than 90% by mass, and especially preferably not less than 95% by mass.

The gel content used herein means that a ratio of an insoluble amount to a total amount of an insoluble amount and a soluble amount in the case where 0.5 g of polymer fine particles obtained by coagulation and dry was immersed in 100 g of toluene, and an insoluble part and a soluble part were divided after standing at 23° C. for 24 hours.

A conjugated diene monomer for constituting the diene rubber used in the elastic core layer includes 1,3-butadiene, isoprene, 2-chrolo-1,3-butadiene, 2-methyl-1,3-butadiene and the like. These may be used alone or in combination of two or more monomers.

The conjugated diene monomer is preferably contained in an amount of 50 to 100% by mass, more preferably 70 to 100% by mass, and even preferably 90 to 100% by mass per 100% by mass of the core layer. In the case where the content of the conjugated diene monomer is less than 50% by mass, the cured product obtained has a tendency to decrease the impact peel-resistant adhesion.

A vinyl monomer polymerizable with the conjugated diene monomer includes vinyl arenes such as styrene, α-methylstyrene, monochlorostyrene, dichlorostyrene; vinyl carboxylic acids such as acrylic acid, methacrylic acid; vinyl cyanides such as acrylonitrile, methacrylonitrile; halogenated vinyls such as chloro vinyl, bromo vinyl, chloroprene; vinyl acetate; alkenes such as ethylene, propylene, butylene, isobutylene; a multifunctional monomer such as diallylphthalate, triallylcyanurate, triallylisocyanurate, divinylbenzene. The vinyl monomer may be used individually or in combination of two or more vinyl monomers. The monomer is especially preferably styrene.

The vinyl monomer copolymerizable with the conjugated diene monomer can be contained in the range of preferably 0 to 50% by mass, more preferably 0 to 30% by mass, and even preferably 0 to 10% by mass of 100% by mass of the core layer. In the case where the content of the vinyl monomer copolymerizable with the conjugated diene monomer is more than 50% by mass, the cured product obtained has a tendency to decrease the impact peel-resistant adhesion.

From the view of effects of highly improving the toughness and the impact peel-resistant adhesion as well as hardly increasing the viscosity with time from the swelling of the core due to lower affinity with the matrix resin, butadiene rubber using 1,3-butadiene, or butadiene-styrene rubber of a copolymer of 1,3-butadiene and styrene is preferable, and butadiene rubber is more preferable. In addition, butadiene-styrene rubber is more preferable in the view of improving the transparency of the cured product obtained from the adjustment of refractive index.

In the present invention, the glass transition temperature of the core layer is preferably not more than 0° C., more preferably not more than −20° C., further preferably not more than −40° C., and especially preferably not more than −60° C. in order to improve the toughness of the cured product obtained. Hereinafter, the glass transition temperature is referred to as "Tg" in some cases.

The volume average particle diameter of the core layer is preferably 0.03 to 2 μm and more preferably 0.05 to 1 μm. It is difficult to stably obtain a core layer having the volume average particle diameter of less than 0.03 μm in many cases. In the case of the volume average particle diameter of greater than 2 μm, the heat-resistance and impact resistance of the molding material are lowered in some cases. The volume average particle diameter can be measured by using Microtrac UPA 150 (manufactured by Nikkiso Co., Ltd).

The amount of the core layer is preferably 40 to 97% by mass, more preferably 60 to 95% by mass, further preferably 70 to 93% by mass, and especially preferably 80 to 90% by mass per 100% by mass of the whole polymer fine particles. In the case of the core layer of less than 40% by mass, effect of improving toughness of the cured product may be lowered. In the case of the core layer of more than 97% by mass, the polymer fine particles are easily aggregated, and the handling of the curable resin composition may become difficult due to high viscosity.

In the present invention, the core layer may be composed of monolayer in some cases, and may be composed of multilayers containing a layer having rubber elasticity. In the case where the core layer is composed of multilayer, the polymer composition of each layer may be different each other within the range of the above disclosures.

<<Intermediate Layer>>

In the present invention, an intermediate layer may be formed between the core layer and the shell layer as necessary. Especially, the intermediate layer may be formed as a rubber-crosslinked layer as set forth below. It is preferable that the intermediate layer is not contained, particularly the following rubber-crosslinked layer is not contained in the viewpoint of effects of improving the toughness and the impact peel-resistant adhesion of the cured product obtained.

When the intermediate layer is used, the ratio of the intermediate layer is preferably 0.1 to 30 parts by mass, more preferably 0.2 to 20 parts by mass, even preferably 0.5 to 10 parts by mass, and particularly preferably 1 to 5 parts by mass per 100 parts by mass of the core layer.

The rubber-crosslinked layer is a polymer of the intermediate layer polymerized with rubber-crosslinked layer components containing 30 to 100% by mass of a multifunctional monomer having two or more radically polymerizable double bonds in the same molecule and 0 to 70% by mass of other vinyl monomer. The rubber-crosslinked layer has effects of lowering the viscosity of the curable resin composition of the present invention, and improving the dispersibility of the polymer fine particles (B) to the epoxy resin (A). In addition, the rubber-crosslinked layer has an effect of improving crosslink density of the core layer and graft efficiency of the shell layer.

The multifunctional monomer does not contain conjugated diene monomer such as butadiene, and includes allyl alkyl (meth)acrylate such as allyl (meth)acrylate, allyl alkyl (meth)acrylate; allyl oxy alkyl (meth)acrylate; multifunctional (meth)acrylate having two or more (meth)acrylic groups such as (poly) ethylene glycol di(meth)acrylate, butane diol di(meth)acrylate, ethylene glycol di(meth)acrylate, triethylene glycol di(meth)acrylate, tetraethylene glycol di(meth)acrylate; diallyl phthalate, triallyl cyanurate, triallyl isocyanurate, divinylbenzene and the like. Allyl methacrylate, triallyl isocyanurate are especially preferable. In the present invention, (meth) acrylate means acrylate and/or methacrylate.

<<Shell Layer>>

The shell layer existing at outermost of the polymer fine particles is a polymer polymerized with a monomer for forming the shell layer. The shell layer contains a shell polymer for improving the compatibility of the polymer fine particles (B) and the epoxy resin (A) and dispersing the polymer fine particles at the state of primary particle in the curable resin composition or the cured product obtained therefrom of the present invention.

The polymer for forming the shell layer is preferably grafted on the core layer and/or the intermediate layer. In the polymer fine particles, the shell layer are preferably graft-polymerized on the core layer, and the shell layer is polymerized with the monomers for forming the shell layer. When the phrase "grafted on the core layer" is referred to, the present invention contains an embodiment in which the shell layer is grafted on the intermediate layer in the case of forming the intermediate layer on the core layer. More precisely, it is preferable that a monomer used in the formation of the shell layer is graft-polymerized on the core polymer for forming the core layer (when the intermediate layer is contained, the monomer is graft-polymerized on the intermediate polymer for forming the intermediate layer, the same applies hereinafter), and the shell polymer is chemically bonded to the rubber polymer (when the rubber polymer is covered with the intermediate layer, it is preferable that the shell polymer is chemically bonded to the intermediate layer polymer). It is preferable that the shell polymer is formed by graft-polymerizing the monomer for forming the shell layer under the presence of the core polymer (when the core polymer is covered with the intermediate polymer, the core polymer in which the intermediate polymer is formed), and a part or all of the core polymer is covered with the shell polymer. Such a polymerization can be carried out by adding a monomer for constituting the shell polymer to a latex containing the core polymer prepared in the state of an aqueous latex, and polymerizing the monomer and the core polymer.

The monomer for forming the shell layer is preferably a monomer having a hydroxyl group, an aromatic vinyl monomer, a vinyl cyanide monomer, a (meth) acrylate monomer, and more preferably a monomer having a hydroxyl group, an aromatic vinyl monomer, a (meth) acrylate monomer in the view of the compatibility and the dispersibility of the polymer fine particles (B) of the curable resin composition. These monomers for forming the shell layer may be used individually or in the appropriate combination.

The total amount of the aromatic vinyl monomer, the vinyl cyanide monomer, and the (meth)acrylate monomer is preferably 10 to 99.5% by mass, more preferably 50 to 99% by mass, even preferably 65 to 98% by mass, particularly preferably 67 to 85% by mass, and most preferably 67 to 80% by mass of 100% by mass of the monomer for forming the shell layer.

In order to improve the impact peel-resistant adhesion of the cured product obtained by curing the curable resin composition of the present invention, a monomer for forming the shell layer is polymerized with at least a monomer having a hydroxyl group in the viewpoint of the chemical bond of the polymer fine particles and the isocyanate group produced by releasing the blocking agent of the blocked urethane (C) as set forth below.

The amount of the monomer having a hydroxyl group is preferably 0.5 to 90% by mass, more preferably 1 to 70% by mass, even preferably 3 to 50% by mass, and particularly preferably 5 to 25% by mass of 100% by mass of the monomer for forming the shell layer. When the amount of the monomer having a hydroxyl group is less than 0.5% by mass of 100% by mass of the monomer for forming the shell layer, impact peel-resistant adhesion of the cured product also are decreased. When the amount of the monomer having a hydroxyl group is more than 90% by mass of 100% of the monomer for forming the shell layer, the viscosity of the curable resin composition is increased, and the handling of the composition becomes difficult in some cases.

The monomer having a hydroxyl group is preferably used for the formation of the shell layer, and more preferably used for the shell layer solely.

The monomer for forming the shell layer preferably contains a monomer having one or more reactive groups selected from the group consisting of an epoxy group, an oxetane group, an amino group, an imide group, a carboxylic acid group, a carboxylic acid anhydride group, a cyclic ester, a cyclic amide group, a benzoxazine group, and a cyanate ester group, and more preferably contains a monomer having an epoxy group, in the view of the chemical bond of the polymer fine particles (B) to the epoxy resin (A) in order to maintain the good dispersibility without coagulating the polymer fine particles (B) in the cured material and the polymer and produce the chemical bond with the component (A).

The amount of the monomer having an epoxy group is preferably 0.5 to 90% by mass, more preferably 1 to 50% by mass, even preferably 2 to 35% by mass, particularly preferably 3 to 20% by mass of 100% by mass of the monomer for forming the shell layer. When the amount of the monomer having an epoxy group is less than 0.5% by mass of 100% by mass of the monomer for forming the shell layer, effect of improving the impact resistance of the cured product is lowered in some cases, and further the impact peel-resistant adhesion of the cured product also are decreased. When the amount of the monomer having an epoxy group is more than 90% by mass of 100% of the monomer for forming the shell layer, effect of improving the impact resistance is lowered, and further the impact peel-resistant adhesion of the cured product is deteriorated in some cases.

The monomer having an epoxy group is preferably used for the formation of the shell layer, and more preferably used for the shell layer solely.

In addition, a multifunctional monomer having two or more radically polymerizable double bonds is preferably used as a monomer for forming the shell layer because the swelling of the polymer fine particles is prevented in the curable resin composition, or the viscosity of the curable resin composition becomes lower to improve the handling. On the contrary, it is preferable that the multifunctional monomer having two or more radically polymerizable double bonds is not used as the monomer for forming the shell layer in the viewpoint of effects of improving the toughness and the impact peel-resistant adhesion of the cured product obtained.

The multifunctional monomer may be contained in an amount of, for example, 0 to 20% by mass, preferably 1 to 20% by mass, and more preferably 5 to 15% by mass per 100% by mass of the monomer for forming the shell layer.

Concrete example of the aromatic vinyl monomer includes styrene, α-methyl styrene, p-methyl styrene, divinyl benzene and the like.

Concrete example of the vinyl cyanide monomer includes acrylonitrile, methacrylonitrile, or the like.

The concrete example of the (meth)acrylate monomer includes (meth) acrylic acid alkyl ester such as methyl (meth)acrylate, ethyl (meth)acrylate, butyl (meth)acrylate and the like.

Concrete examples of monomers having a hydroxyl group include hydroxyl linear alkyl (meth) acrylate (particularly hydroxyl linear C1-6 alkyl (meth)acrylate) such as 2-hydroxyl ethyl (meth) acrylate, hydroxylpropyl(meth)acrylate, 4-hydroxylbutyl (meth)acrylate; caprolactone-modified hydroxyl (meth)acrylate; hydroxyl branched alkyl (meth) acrylate such as alpha-(hydroxymethyl) methyl acrylate, alpha-(hydroxylmethyl) ethyl acrylate; hydroxyl group-containing (meth)acrylates such as mono (meth)acrylate of polyester diol (particularly saturated polyester diol) obtained by reacting divalent carboxylic acid (phthalic acid and the like) and divalent alcohol (propyleneglycol and the like).

Concrete example of the monomer having an epoxy group includes a vinyl monomer containing a glycidyl group such as glycidyl (meth) acrylate, 4-hydroxy butyl (meth) acrylate glycidyl ether, allyl glycidyl ether and the like.

Concrete example of the multifunctional monomer having two or more radically polymerizable double bonds is exemplified by the same monomer as the above-mentioned multifunctional monomer. The multifunctional monomer is preferably allylmethacrylate and triallylisocyanurate.

In the present invention, the shell layer is a polymer polymerized with (100% by mass of) the monomer for forming the shell layer containing 0 to 50% by mass (preferably 1 to 50% by mass, more preferably 2 to 48% by mass) of the aromatic vinyl monomer (preferably styrene), 0 to 50% by mass (preferably 0 to 30% by mass, more preferably 0% by mass) of the vinyl cyanide monomer (preferably acrylonitrile), 0 to 100% by mass (preferably 0 to 90% by mass, more preferably 20 to 85% by mass) of (meth) acrylate monomer (preferably methyl methacrylate), and 0 to 50% by mass (preferably 0 to 30% by mass, more preferably 0% by mass) of the monomer having an epoxy group (preferably glycidyl methacrylate). This shell polymer can exhibit well-balanced effects of improving the desired toughness and the mechanical property. These monomers may be used individually or in the combination of two or more monomers.

The shell layer may be polymerized with other monomer in addition to the above-mentioned monomer. The graft rate of the shell layer is preferably 70% or more, more preferably 80% or more, and even preferably 90% or more. In the case of less than 70% of the graft rate, the viscosity of the curable resin composition may be increased. Incidentally, the method of calculating the graft rate is as follows.

The powder of the polymer fine particles is obtained by coagulating and dehydrating the aqueous latex containing the polymer fine particles, and drying the polymer fine particles. Then, 2 g of the powder of the polymer fine particles is immersed in 100 g of methylethylketone (MEK) at 23° C. for 24 hours, separated in MEK soluble content and MEK insoluble content, and separated methanol insoluble content from MEK soluble content. Thus, the graft rate is calculated by determining a ratio of MEK insoluble content to the total content of MEK insoluble content and methanol insoluble content.

<<Method for Preparing Polymer Fine Particles>>
(Method for Preparing Core Layer)

When the polymer of the core layer for constituting the polymer fine particles used in the present invention is polymerized with at least monomer (first monomer) selected from diene monomer (conjugated diene monomer) and (meth) acrylate, the core layer can be prepared according to emulsion polymerization, suspension polymerization, micro-suspension polymerization and the like, and methods described in WO2005/028546 can be used.

In addition, when the polymer of the core layer contains the polysiloxane polymer, the core layer can be prepared by emulsion polymerization, suspension polymerization, micro suspension and the like. The shell layer can be prepared according to methods of WO 2006/070664.

(Method of Forming Shell Layer and Intermediate Layer)

The intermediate layer can be formed by polymerizing a monomer for forming the intermediate layer with a known radical polymerization. In the case where the rubber elastomer constituting the core layer is obtained as an emulsion, it is preferable that the polymerization of the monomer having two or more radically polymerizable double bonds is carried out with the emulsion polymerization.

The shell layer can be formed by polymerizing a monomer for forming the shell layer with a known radical polymerization. In the case where a polymer particle precursor constituting the core layer or the core layer covered with the intermediate layer is obtained as an emulsion, it is preferable that the polymerization of the monomer for forming the shell layer is carried out with the emulsion polymerization, and the shell layer can be prepared according to methods of WO 2005/028546.

The following dispersants can be mentioned as examples of emulsifiers (dispersants) usable in the emulsion polymerization: various acids including alkyl or aryl sulfonic acids such as dioctylsulfosuccinic acid and dodecylbenzenesulfonic acid, alkyl or arylether sulfonic acids, alkyl or arylsulfuric acids such as dodecylsulfuric acids, alkyl or arylether sulfuric acids, alkyl or aryl-substituted phosphoric acids, alkyl or arylether-substituted phosphoric acids, N-alkyl or arylsarcosinic acids such as dodecylsarcosinic acid, alkyl or arylcarboxylic acids such as oleic acid and stearic acid, and alkyl or arylether carboxylic acids, and anionic emulsifiers (dispersants) such as alkali metal salts or ammonium salts of these acids; nonionic emulsifiers (dispersants) such as alkyl or aryl-substituted polyethylene glycols; and derivatives of polyvinyl alcohol, alkyl-substituted celluloses, polyvinyl pyrrolidone, and polyacrylic acid. Any of these emulsifiers (dispersants) may be used alone, or two or more of these may be used in combination.

The amount of the emulsifier (dispersant) is preferably as small as possible, but the dispersion stability of the polymer fine particles in the aqueous latex should be secured. The emulsifier (dispersant) preferably has as high water solubility as possible. An emulsifier (dispersant) having high water solubility can be easily washed out with water, and thus its bad influence on the final cured product can be easily avoided.

In the case of adopting emulsion-polymerization, as known initiators, thermal decomposition initiator such as 2,2'-azobisisobutylonitrile, hydrogen peroxide, potassium persulphate, ammonium persulfate can be used.

In addition, redox type initiators of peroxides such as organic peroxides (e.g. t-butylperoxy isopropyl carbonate, p-menthane hydroperoxide, cumene hydroperoxide, dicumyl peroxide, t-butyl hydroperoxide, di-t-butyl peroxide, t-hexyl peroxide, etc.) and inorganic peroxides (e.g. hydrogen peroxide, potassium persulfate, ammonium persulfate, etc.) in combination with reducing agents (e.g. sodium formaldehyde sulfoxylate, glucose, etc.) as needed and transition metal salts (e.g. ferrous sulfate, etc.) as needed, chelating agents (e.g. disodium ethylenediaminetetraacetate, etc.) as needed, or further phosphorus-containing compounds (e.g. sodium pyrophosphate, etc.) as needed can also be used.

In the case of polymerization using a redox type initiator, it is possible to carry out the polymerization even at a low temperature at which the peroxide does not cause substantially thermal decomposition and to set the polymerization temperature in a wide range, and therefore such a polymerization is preferable. Above all, organic peroxides such as cumene hydroperoxide, dicumyl peroxide, and t-butyl hydroperoxide are preferably used as a redox type initiator. The amount of the initiator or the amount of the reducing agent/transition metal salt/chelating agent when a redox-type initiator is used can be used in the range known in the art. Also, when a monomer having two or more radically polymerizable double bonds is polymerized, a known chain transfer agent can be used in the known range. It is possible to additionally use a surfactant, and such use of the surfactant is also included in the known range.

The conditions to be applied in the polymerization, such as polymerization temperature, pressure, and deoxidation, are those known in the art. In addition, polymerization of the monomer for intermediate layer formation may be carried out in one stage or in two or more stages. Such polymerization includes, for example, a method of adding a monomer for intermediate layer formation at one time to an emulsion of a rubber elastic body constituting an elastic core layer, a method of continuously adding a monomer for intermediate layer formation to an emulsion of a rubber elastic body constituting an elastic core layer, and, in addition, a method of carrying out polymerization after adding an emulsion of a rubber elastic body constituting an elastic core layer to a reactor into which a monomer for intermediate layer formation has previously been charged.

<Blocked Urethane (C)>

The curable resin composition of the present invention essentially contains 1 to 100 parts by mass of blocked urethane (C) per 100 parts by mass of the epoxy resin (A). When the blocked urethane (C) is combined with polymer fine particles (B) having a hydroxyl group on the shell layer, a cured product obtained by curing the curable resin composition remarkably have excellent impact peel-resistant adhesion.

The blocked urethane is an elastomer and a compound containing a urethane group and/or urea group and all or a part of isocyanate group at terminal of the compound is capped with various blocking agent having an active hydrogen group. Particularly preferably, the blocked urethane is a compound in which all of the isocyanate group at terminal are capped with the blocking agent. The compound is obtained by reacting an organic polymer having an active hydrogen group at terminal with a polyisocyanate compound in an excess amount to prepare a polymer (urethane prepolymer) having an urethane group and/or urea group in a main chain and an isocyanate group at terminal, and subsequently or simultaneously capping all or a part of an isocyanate group of the urethane prepolymer with a blocking agent having an active hydrogen group.

The blocked urethane is, for example, represented by the following general formula (1):

$$A\text{-}(NR^2\text{—}C(\text{=}O)\text{—}X)_a \qquad (1)$$

wherein each of $R^2$ of the number a is a hydrocarbon group of carbon atoms 1 to 20. a is an average number of capped isocyanate group per one molecule. a is preferably 1.1 or more, more preferably 1.5 to 8, even preferably 1.7 to 6, and particularly preferably 2 to 4. X is a residue excluding an active hydrogen atom from the blocking agent. A is a residue excluding an isocyanate group at terminal from a prepolymer having an isocyanate group at terminal.

The hydrocarbon group may be an aliphatic hydrocarbon group, an alicyclic hydrocarbon group, and an aromatic hydrocarbon group. The aliphatic hydrocarbon group includes alkyl groups such as methyl group, ethyl group, propyl group, butyl group, pentyl group, hexyl group, heptyl group, octyl group, nonyl group, decyl group, dodecyl group; alkenyl group such as ethenyl group, propenyl group, butenyl group, pentenyl group, hexenyl group, heptenyl group, octenyl group, nonenyl group, decenyl group, undecenyl group, dodecenyl group and the like. The aliphatic hydrocarbon group may be linear, or branched. The alicyclic hydrocarbon group includes cycloalkyl group such as cyclopropyl group, cyclobutyl group, cyclopentyl group, cyclohexyl group, cycloheptyl group, cyclooctyl group, cyclononyl group, cyclodecyl group; cyclopropenyl group, cyclobutenyl group, cyclopentenyl group, cyclohexenyl group, cycloheptenyl group, cyclooctenyl group, cyclopentadienyl group and the like. The aromatic hydrocarbon group includes phenyl group, naphthyl group, anthryl group, phenanthryl group, biphenyl group, terphenyl group and the like.

The blocked urethane has the number average molecular weight of preferably 2000 to 40000, more preferably 3000 to 30000, and particularly preferably 4000 to 20000 based on molecular weight of polystyrene measured by GPC. The distribution of the molecular weight of the blocked urethane, that is, ratio of the weight average molecular weight to the number average molecular weight of the blocked urethane is preferably 1 to 4, more preferably 1.2 to 3, and particularly preferably 1.5 to 2.5.

(C-1 Organic Polymer Having Active-Hydrogen-Containing Group at Terminal)

Examples of the main chain backbone that constitutes the organic polymer having an active-hydrogen-containing group at a terminal thereof include a polyether polymer, a polyacrylate polymer, a polyester polymer, a polydiene polymer, a saturated hydrocarbon polymer (a polyolefin) and a polythioether polymer.

(Active-Hydrogen-Containing Group)

Examples of the active-hydrogen-containing group that constitutes the organic polymer having an active-hydrogen-containing group at a terminal thereof include a hydroxyl group, an amino group, an imino group and a thiol group. Among these groups, a hydroxyl group, an amino group and an imino group are preferred from the viewpoint of availability, and a hydroxyl group is more preferred from the viewpoint of the easiness of handling (viscosity) of the resultant blocked urethane.

Examples of the organic polymer having an active-hydrogen-containing group at a terminal thereof include a polyether polymer having a hydroxyl group at a terminal thereof (polyether polyol), a polyether polymer having an amino group and/or an imino group at a terminal thereof (polyetheramine), a polyacrylate polyol, a polyester polyol, a diene polymer having a hydroxyl group at a terminal thereof (polydiene polyol), a saturated hydrocarbon polymer having a hydroxyl group at a terminal thereof (a polyolefin polyol), a polythiol compound and a polyamine compound. Among these organic polymers, polyether polyol, polyetheramine and a polyacrylate polyol are preferred, because these organic polymers have excellent compatibility with the epoxy resin (A), have relatively low glass transition temperatures and cured articles each have excellent impact resistance at lower temperatures. Particularly, polyether polyol and polyetheramine are more preferred because these organic polymers have low viscosities and therefore can be handled satisfactorily, and polyether polyol is particularly preferred.

The organic polymers each having an active-hydrogen-containing group at a terminal thereof, each of which can be used for the preparation of the urethane prepolymer that is a precursor of the blocked urethane, may be used singly, or two or more of them may be used in combination.

The number average molecular weight of the organic polymer having an active-hydrogen-containing group at a terminal thereof is preferably 800 to 7000, more preferably 1500 to 5000, and particularly preferably 2000 to 4000, based on the molecular weight of polystyrene, as measured by GPC.

(Polyether Polymer)

The polyether polymer is substantially a polymer having a repeating unit represented by general formula (2):

$$-R^1-O- \quad (2)$$

wherein $R^1$ represents a linear or branched alkylene group having 1 to 14 carbon atoms, $R^1$ in general formula (2) is preferably a linear or branched alkylene group having 1 to 14 carbon atoms, preferably 2 to 4 carbon atoms. Specific examples of the repeating unit represented by general formula (2) include $-CH_2O-$, $-CH_2CH_2O-$, $-CH_2CH(CH_3)O-$, $-CH_2CH(C_2H_5)O-$, $-CH_2C(CH_3)_2O-$, and $-CH_2CH_2CH_2CH_2O-$. The main chain backbone of the polyether polymer may be composed of only a single repeating unit, or may be composed of two or more repeating units. Particularly, a polyether polymer containing, as the main component, a polypropylene glycol having not less than 50% by mass of a propylene oxide repeating is preferred in the viewpoint of adhesion strength to T-peeling. A polyether polymer containing, as the main component, polytetramethylene glycol (PTMG), which is produced by the ring-opening polymerization of tetrahydrofuran, is also preferred in the viewpoint of the resistance to dynamic cleavage.

In the case of combining the blocked urethane (C) and the polymer fine particles (B), a mass ratio of the polymer fine particles to the blocked urethane (C) is preferably 0.1 to 10, more preferably 0.2 to 5, even preferably 0.3 to 4, and particularly preferably 1 to 3.

(Polyether Polyol)

The polyether polyol is a polyether polymer having a hydroxyl group at a terminal thereof, and the polyetheramine is a polyether polymer having an amino group or an imino group at a terminal thereof.

(Polyacrylate Polyol)

As the polyacrylate polyol, a polyol which has a (meth) acrylic acid alkyl ester (co)polymer as a backbone and has a hydroxyl group in the molecule can be mentioned. Particularly, a polyacrylate polyol which is produced by the copolymerization of a hydroxyl group-containing (meth) acrylic acid alkyl ester monomer, such as 2-hydroxyethyl methacrylate, is preferred.

(Polyester Polyol)

Examples of the polyester polyol include polymers each of which is produced by the polycondensation of a polybasic acid (e.g., maleic acid, fumaric acid, adipic acid, phthalic acid) or an acid anhydride thereof with a polyhydric alcohol (e.g., ethylene glycol, propylene glycol, 1,4-butanediol, 1,6-hexanediol, diethylene glycol, dipropylene glycol, neopentyl glycol) at a temperature ranging from 150 to 270° C. in the presence of an esterification catalyst. In addition, ring-opened polymers of ε-caprolactone, valerolactone and the like, and active hydrogen compounds each having at least two active hydrogen atoms, such as polycarbonate diol and castor oil, can also be mentioned as the examples of the polyester polyol.

(Polydiene Polyol)

Examples of the polydiene polyol include polybutadiene polyol, polyisoprene polyol and polychloroprene polyol, and polybutadiene polyol is particularly preferred.

(Polyolefin Polyol)

Examples of the polyolefin polyol include polyisobutylene polyol and hydrogenated polybutadiene polyol.

(C-2 Polyisocyanate)

Concrete examples of the polyisocyanate can includes aromatic polyisocyanates such as toluene (trilene)diisocyanate, diphenylmethanediisocyanate, xylene diisocyanate; aliphatic polyisocyantes such as isophorone diisocyanate, hexamethylene diisocyanate, hydrogenated toluene diisocyanate, hydrogenated diphenyl methane diisocyanate and the like. Among these, the aliphatic polyisocyanate is preferred in the viewpoint of the heat resistance, and isophorone diisocyanate and hexamethylene diisocyanate are more preferred in the viewpoint of the availability.

(C-3 Blocking Agent)

Examples of the blocking agent include a primary amine blocking agent, a secondary amine blocking agent, an oxime blocking agent, a lactam blocking agent, an active methylene blocking agent, an alcohol blocking agent, a mercaptan blocking agent, an amide blocking agent, an imide blocking agent, a heterocyclic aromatic compound blocking agent, a hydroxy-functional (meth)acrylate blocking agent and a phenol blocking agent. Among these blocking agents, an oxime blocking agent, a lactam blocking agent, a hydroxy-functional (meth)acrylate blocking agent and a phenol blocking agent are preferred, and a hydroxy-functional (meth)acrylate blocking agent and a phenol blocking agent are more preferred, and a phenol blocking agent is even preferred.

Examples of the primary amine blocking agent include butylamine, isopropylamine, dodecylamine, cyclohexylamine, aniline and benzylamine. Examples of the secondary amine blocking agent include dibutylamine, diisopropylamine, dicyclohexylamine, diphenylamine, dibenzylamine, morpholine and piperidine. Examples of the oxime blocking agent include formaldoxime, acetaldoxime, acetoxime, methyl ethyl ketoxime, diacetyl monoxime and cyclohexane oxime. Examples of the lactam blocking agent include ε-caprolactam, δ-valerolactam, γ-butyrolactam and β-butyrolactam. Examples of the active methylene blocking agent include ethyl acetoacetate and acetylacetone. Examples of the alcohol blocking agent include methanol, ethanol, propanol, isopropanol, butanol, amyl alcohol, cyclohexanol, 1-methoxy-2-propanol, ethylene glycol monomethyl ether, ethylene glycol monoethyl ether, propylene glycol monomethyl ether, benzyl alcohol, methyl glycolate, butyl glycolate, diacetone alcohol, methyl lactate and ethyl lactate. Examples of the mercaptan blocking agent include butyl mercaptan, hexyl mercaptan, decyl mercaptan, t-butyl mercaptan, thiophenol, methylthiophenol and ethylthiophenol. Examples of the amide blocking agent include acetamide and benzamide. Examples of the imide blocking agent include succinimide and maleinimide. Examples of the heterocyclic aromatic compound blocking agent include an imidazole compound such as imidazole and 2-ethylimidazole, a pyrrole compound such as pyrrole, 2-methylpyrrole and 3-methylpyrrole, a pyridine compound such as pyridine, 2-methylpyridine and 4-methylpyridine, and a diazabicycloalkene such as diazabicycloundecene and diazabicyclononene.

The hydroxy-functional (meth)acrylate blocking agent may be a (meth)acrylate having at least one hydroxyl group. Specific examples of the hydroxy-functional (meth)acrylate blocking agent include 2-hydroxyethyl (meth)acrylate, 2-hydroxypropyl (meth) acrylate, 4-hydroxybutyl (meth) acrylate, and 2-hydroxybutyl (meth) acrylate.

The phenol blocking agent contains at least one phenolic hydroxyl group, i.e., a hydroxyl group that is directly bound to a carbon atom in an aromatic ring. The phenol blocking agent may have at least two phenolic hydroxyl groups, but preferably contains only one phenolic hydroxyl group. The phenol blocking agent may contain other substituent, and the substituent is preferably one that cannot react with an isocyanate group under capping reaction conditions and is preferably an alkenyl group or an allyl group. Examples of the above-mentioned other substituent include an alkyl group such as a linear alkyl group, a branched alkyl group and a cycloalkyl group; an aromatic group (e.g., a phenyl group, an alkyl-substituted phenyl group, an alkenyl-substituted phenyl group); an aryl-substituted alkyl group; and a phenol-substituted alkyl group. Specific examples of the phenol blocking agent include phenol, cresol, xylenol, chlorophenol, ethylphenol, allylphenol (particularly o-allylphenol), resorcinol, catechol, hydroquinone, bisphenol, bisphenol A, bisphenol AP (1,1-bis(4-hydroxylphenyl)-1-phenylethane), bisphenol F, bisphenol K, bisphenol M, tetramethylbiphenol and 2,2'-diallylbisphenol A.

It is preferred that the blocking agent is bound to a terminal of the polymer chain in the urethane prepolymer in such a manner that the terminal to which the blocking agent is bound has no reactive group. The above-mentioned blocking agent may be used singly, or two or more of them may be used in combination. The blocked urethane may contain a residue of a cross-linking agent, a residue of a chain extender or the residues the cross-linking agent and the chain extender.

The blocked isocyanate used in the present invention is preferably a compound of which a urethane prepolymer containing polyalkylene glycol structure is capped with a blocking agent, and more preferably a compound of which a urethane prepolymer containing polypropylene glycol structure is capped with a blocking agent (preferably phenol blocking agent) or a compound of which a urethane prepolymer containing polytetramethylene glycol structure is capped with a blocking agent (preferably phenol blocking agent). The blocked isocyanate suitably can be used to improve thixotropy and adhesive properties.

The compound of which a urethane prepolymer containing polypropylene glycol structure is capped with a blocking agent (preferably phenol blocking agent) suitably can be used in order to improve dynamic resistance to cleavage and T-peeling adhesive strength. The compound of which a urethane prepolymer containing polytetramethylene glycol structure is capped with a blocking agent (preferably phenol blocking agent) may be used in order to improve dynamic resistance to cleavage compared with the compound of which a urethane prepolymer containing polypropylene glycol structure is capped with a blocking agent (preferably phenol blocking agent).

The blocked NCO equivalent of the blocked isocyanate is, for example, 300 to 3000, and preferably 500 to 2000. The blocked isocyanate having at least one of these properties suitably can be used in the present invention.

(Crosslinking Agent)

The cross-linking agent preferably has a molecular weight of not more than 750, more preferably 50 to 500, and is a polyol or a polyamine compound each having at least three hydroxyl groups, amino groups and/or imino groups per molecule. The cross-linking agent can impart branches to the blocked urethane, and is therefore useful for increasing the functionality (i.e., the number of capped isocyanate groups per molecule) of the blocked urethane.

(Chain Extender)

The chain extender preferably has a molecular weight of not more than 750, more preferably 50 to 500, and is a polyol or a polyamine compound each having two hydroxyl groups, amino groups and/or imino groups per molecule. The chain extender is useful for increasing the molecular weight of the blocked urethane without increasing the functionality.

Specific examples of the cross-linking agent and the chain extender include trimethylolpropane, glycerin, trimethylolethane, ethylene glycol, diethylene glycol, propylene glycol, dipropylene glycol, sucrose, sorbitol, pentaerythritol, ethylenediamine, triethanolamine, monoethanolamine, diethanolamine, piperazine and aminoethylpiperazine. In addition, compounds each having at least two phenolic hydroxyl groups, such as resorcinol, catechol, hydroquinone, bisphenol, bisphenol A, bisphenol AP (1,1-bis(4-hydroxylphenyl)-1-phenylethane), bisphenol F, bisphenol K, bisphenol M, tetramethylbiphenol and 2,2'-diallylbisphenol A, can also be mentioned as the examples of the cross-linking agent and the chain extender.

(Amount of Blocked Urethane)

An amount of the blocked urethane (C) is 1 to 100 parts by mass, preferably 2 to 50 parts by mass, more preferably 3 to 40 parts by mass, and particularly preferably 5 to 30 parts by mass per 100 parts by mass of the epoxy resin (A). In the case of less than 1 part by mass, the impact peel-resistant adhesion of the cured product is decreased in some cases. In the case of more than 100 parts by mass, the heat resistance and modulus (rigidity) of the cured product is decreased in some cases. The blocked urethane (C) may be used individually or in two or more kinds.

<Epoxy Curing Agent (D)>

In the present invention, an epoxy curing agent (D) may be used according to necessity.

If the curable resin composition of the present invention is used as a one-component type composition (a one-pack curable resin composition, etc.), it is preferred to choose the epoxy curing agent (D) such that the adhesive is cured rapidly in heating to a temperature of 80° C. or higher, preferably a temperature of 140° C. or higher. On the contrary, it is preferred to choose the epoxy curing agent (D) and the curing accelerator (E) described below such that the adhesive cures very slowly at room temperature (about 22° C.) or temperatures up to at least 50° C. even if it cures.

As the epoxy curing agent (D), a component that exhibits activity by heating (sometimes referred to as a "latent curing agent") can be used. As such a latent epoxy curing agent, N-containing curing agents such as specific amine-based curing agents (including imine-based curing agents) can be used, and examples thereof include boron trichloride/amine complexes, boron trifluoride/amine complexes, dicyandiamide, melamine, diallylmelamine, guanamines (e.g., acetoguanamine and benzoguanamine), aminotriazoles (e.g., 3-amino-1,2,4-triazole), hydrazides (e.g., adipic acid dihydrazide, stearic acid dihydrazide, isophthalic acid dihydrazide, and semicarbazide), cyanoacetamide, and aromatic polyamines (e.g., metaphenylenediamine, diaminodiphenylmethane, and diaminodiphenylsulfone). It is more preferred to use dicyandiamide, isophthalic acid dihydrazide, adipic acid dihydrazide, or 4,4'-diaminodiphenylsulfone, and dicyandiamide is particularly preferred.

Among the above curing agents (D), it is preferable that the latent curing agent can prepare the curable resin composition of the present invention in one pack type.

In the curable resin composition, an amount of the latent epoxy curing agent (dicyanediamide) is preferably 4 to 10 parts by mass, more preferably 5 to 9 parts by mass, even preferably 5 to 9 parts by mass, and even more preferably 6 to 8 parts by mass per 100 parts by mass of the epoxy resin (A). In the case of less than 4 parts by mass, the curing becomes insufficient and the adhesion may be decreased. In the case of more than 10 parts by mass, the adhesion of the curd product is decreased in some cases.

When the curable resin composition of the present invention is used as a two-component type composition or a multi-component type composition, amine-based curing agents (including imine-based curing agents) other than the above-described ones or mercaptan-type curing agents (also referred to as room temperature curable curing agents) can be chosen as an epoxy curing agent (D) that exhibits activity at a relatively low temperature of about room temperature.

Examples of the epoxy curing agent (D) having activity at relatively lower temperature include a linear aliphatic polyamine such as diethylenetriamine, triethylenetetramine, tetraethylenepentamine, dipropylenediamine, diethylaminopropylamine and hexamethylenediamine; a cyclic aliphatic polyamine such as N-aminoethylpiperazine, bis(4-amino-3-methylcyclohexyl)methane, menthenediamine, isophoronediamine, 4,4'-diaminodicyclohexylmethane, 3,9-bis(3-aminopropyl)-2,4,8,10-tetraoxaspiro[5.5]undecane (spiroacetaldiamine), norbornanediamine, tricyclodecanediamine and 1,3-bisaminomethylcyclohexane; an aliaromatic amine such as metaxylenediamine; a polyamine epoxy resin adduct which is a reaction product of an epoxy resin with an excessive amount of a polyamine; a ketimine which is a dehydration reaction product of a polyamine with a ketone such as methyl ethyl ketone and isobutyl methyl ketone; a poly(amido amine) which is produced by the condensation between a dimer of a tall oil fatty acid (dimer acid) with a polyamine; and an amide amine which is produced by the condensation between a tall oil fatty acid with a polyamine; polymercaptanes and the like.

As another example of the epoxy curing agent (D), an amine-terminated polyether which contains a polyether main chain and has preferably 1 to 4 (more preferably 1.5 to 3) amino groups and/or imino groups on average per molecule can also be used. Examples of a commercially available amine-terminated polyether include Jeffamine D-230, Jeffamine D-400, Jeffamine D-2000, Jeffamine D-4000 and Jeffamine T-5000, manufactured by HUNTSMAN CORPORATION, and the like.

As the epoxy curing agent (D), an amine-terminated rubber which contains a conjugated diene polymer main chain and has preferably 1 to 4 (more preferably 1.5 to 3) amino groups and/or imino groups on average per molecule can also be used. In this regard, the main chain of the rubber is preferably a polybutadiene homopolymer or copolymer, more preferably a polybutadiene/acrylonitrile copolymer, particularly preferably a polybutadiene/acrylonitrile copolymer having an acrylonitrile monomer content of 5 to 40% by mass (more preferably 10 to 35% by mass, even preferably 15 to 30% by mass). An example of a commercially available amine-terminated rubber is Hypro 1300X16 ATBN which is a product manufactured by CVC Thermoset Specialties.

It is more preferred to use a poly(amido amine), an amine-terminated polyether and an amine-terminated rubber, and it is particularly preferred to use a combination of a poly(amido amine), an amine-terminated polyether and an amine-terminated rubber, among the above-mentioned amine curing agents having activity at a relatively lower temperature such as room temperature.

As the epoxy curing agent (D), acid anhydrides and phenols can also be used. Although acid anhydrides and phenols need high temperature as compared with amine-based curing agents, they are long in pot life and resulting cured products are good in balance of physical properties such as electric properties, chemical properties, and mechanical properties. Examples of the acid anhydrides include polysebacic polyanhydride, polyazelaic polyanhydride, succinic anhydride, citraconic anhydride, itaconic anhydride, alkenyl-substituted succinic anhydrides, dodecenylsuccinic anhydride, maleic anhydride, tricarballylic anhydride, nadic anhydride, methylnadic anhydride, linoleic acid adducts with maleic anhydride, alkylated endoalkylenetetrahydrophthalic acid anhydrides, methyltetrahydrophthalic anhydride, tetrahydrophthalic anhydride, hexahydrophthalic anhydride, pyromellitic dianhydride, trimellitic anhydride, phthalic anhydride, tetrachlorophthalic anhydride, tetrabromophthalic anhydride, dichloromaleic anhydride, chloranilic anhydride, and chlorendic anhydride, and maleic anhydride-grafted polybutadiene. Examples of the phenols include phenol novolac, bisphenol A novolac, and cresol novolac. The epoxy curing agent (D) may be used individually or in two or more kinds.

The epoxy curing agent (D) is used in an amount sufficient for curing the composition. Typically, a sufficient curing agent to consume at least 80% of the epoxide groups existing in the composition is supplied. An excessively large amount exceeding an amount required for the consumption of the epoxide groups is usually not necessary. The amount of the epoxy curing agent (D) to be used is preferably 1 to 80 parts by mass, more preferably 2 to 40 parts by mass, even more preferably 3 to 30 parts by mass, and particularly preferably 5 to 20 parts by mass, relative to 100 parts by mass of the epoxy resin (A). If it is less than 1 part by mass, the curability of the curable resin composition of the present invention may be impaired. If it is more than 80 parts by mass, the storage stability of the curable resin composition of the present invention may be impaired and may be difficult to handle.

<Curing Accelerator (E)>

The curing accelerator (E) can be used in the present invention as necessary.

The curing accelerator (E) is a catalyst for promoting the reaction of the epoxy group and the epoxide reactive group of the curing agent, the adhesive and the like.

Examples of the curing accelerator (E) include ureas such as p-chlorophenyl-N,N-dimethylurea (trade name: Monuron), 3-phenyl-1,1-dimethylurea (trade name: Phenuron), 3,4-dichlorophenyl-N,N-dimethylurea (trade name: Diuron), N-(3-chloro-4-methylphenyl)-N',N'-dimethylurea (trade name: Chlortoluron), 1,1-dimethylphenylurea (trade name: Dyhard); tertiary amines such as benzyldimethylamine, 2,4,6-tris(dimethylaminomethyl)phenol, 2-(dimethylaminomethyl)phenol, 2,4,6-tris(dimethylaminomethyl)phenol incorporated in a poly(p-vinylphenol) matrix, triethylenediamine, and N,N-dimethylpiperidine; imidazoles such as C1-C12 alkyleneimidazole, N-arylimidazole, 2-methylimidazole, 2-ethyl-2-methylimidazole, N-butylimidazole, 1-cyanoethyl-2-undecylimidazolium trimellitate, and addition products of epoxy resins and imidazole; and 6-caprolactam. The catalyst may have been enclosed or alternatively may be latent such that it will become active only at the time when the temperature is raised.

The tertiary amines or the imidazoles can increase a curing rate, physical properties (heat resistance) of a cured product, and the like by being used together with the amine-based curing agent of the epoxy curing agent (D). The curing accelerator (E) may be used individually or in the combination of two or more kinds of curing accelerators.

The amount of the curing accelerator (E) to be used is preferably 0.1 to 10 parts by mass, more preferably 0.2 to 5 parts by mass, even more preferably 0.5 to 3 parts by mass, and particularly preferably 0.8 to 2 parts by mass, relative to 100 parts by mass of the epoxy resin (A). If it is less than 0.1 parts by mass, the curability of the curable resin composition of the present invention may be impaired. If it is more than 10 parts by mass, the storage stability of the curable resin composition of the present invention may be impaired and may be difficult to handle.

<Strengthening Agent Other than Polymer Fine Particles (B) and Blocked Urethane (C)>

In the present invention, in order to further improve properties such as toughness, impact resistance, shearing adhesion, and adhesion to peeling, rubber modified epoxy resin or urethane modified epoxy resin can be used as a strengthening agent other than polymer fine particles (B) and blocked urethane (C). The rubber modified epoxy resin or urethane modified epoxy resin is not contained in the epoxy resin. The strengthening agent other than polymer fine particles (B) and blocked urethane (C) may be used individually or in the combination of two or more kinds of the strengthening agent.

<<Rubber Modified Epoxy Resin>>

The rubber-modified epoxy resin is a reaction product having 1.1 or more of epoxy groups, and preferably 2 or more of epoxy groups on average per one molecule obtained by reacting the rubber and the epoxy group-containing compound. The rubber includes rubber polymers such as acrylonitrile butadiene rubber (NBR), styrene butadiene rubber (SBR), hydrogenated nitrile rubber (HNBR), ethylenepropylene rubber (EPDM), acrylate rubber (ACM), butyl rubber (IIR), butadiene rubber, polyoxyalkylene such as polypropylene oxide, polyethylene oxide, polytetramethylene oxide and the like. The rubber polymer has preferably a reactive group such as an amino group, a hydroxyl group, or a carboxyl group at terminal. The rubber-modified epoxy resin used in the present invention is a reaction product obtained by reacting the rubber polymer and the epoxy resin at appropriate compounding ratio according to known methods. Among these, acrylonitrile-butadiene rubber-modified epoxy resin and polyoxyalkylene-modified epoxy resin are preferable in the view of the adhesion and the peel and impact-resistant adhesion of the obtained curable resin composition, and acrylonitrile-butadiene rubber-modified epoxy resin is more preferable. For example, acrylonitrile-butadiene rubber-modified epoxy resin is obtained by the reaction of NBR having carboxyl group at terminal (CTBN) with bisphenol A epoxy resin.

The amount of acrylonitrile monomer is preferably 5 to 40% by mass, more preferably 10 to 35% by mass, even preferably 15 to 30% by mass of 100% by mass of the acrylonitrile-butadiene rubber in the view of the adhesion and the impact peel-resistant adhesion of the obtained curable resin composition. The amount of acrylonitrile monomer is particularly preferably 20 to 30% by mass of 100% by mass of the acrylonitrile-butadiene rubber in the view of the workability of the obtained curable resin composition.

The rubber modified epoxy resin includes addition reaction product (hereinafter, referred to as adduct) of polyoxyalkylene having an amino group at terminal and the epoxy resin. Adducts can be easily prepared according to known methods such as U.S. Pat. Nos. 5,084,532 and 6,015,865. The epoxy resin used in the preparation of adducts includes concrete examples of the component (A) exemplified in the present invention, and bisphenol A epoxy resin and bisphenol F epoxy resin are preferable, and bisphenol A epoxy resin is more preferable. The available polyoxyalkylenes having an amino group at terminal include Jeffamine D-230, Jeffamine D-400, Jeffamine D-2000, Jeffamime D-4000, Jeffamine T-5000, manufactured by Huntsman CORPORATION, and the like.

The average number of epoxide reactive terminal group per one molecule of the rubber-modified epoxy resin is preferably 1.5 to 2.5, and more preferably 1.8 to 2.2. The rubber-modified epoxy resin has the number average molecular weight of preferably 1000 to 10000, more preferably 2000 to 8000, and particularly preferably 3000 to 6000, based on the molecular weight of polystyrene measured by GPC.

The method for manufacturing the rubber-modified epoxy resin is not limited particularly, and can be prepared by reacting the rubber and the epoxy group-containing compound under the condition where the amount of the epoxy group-containing compound is large. Concretely, it is preferable to prepare the rubber-modified epoxy resin by reacting the epoxy group-containing compound having 2 or more equivalents per one equivalent of epoxy reactive terminal of the rubber. It is more preferable to prepare the rubber-modified epoxy resin by reacting the epoxy group-containing compound in a sufficient amount such that the obtained product is a mixture of adduct of the rubber and the epoxy group-containing compound and the free epoxy group-containing compound. The rubber-modified epoxy resin is prepared by heating at 100 to 250° C. under the presence of catalyst such as phenyldimethyl urea and triphenylphosphine. The epoxy group-containing compound used in the preparation of the rubber-modified epoxy resin is not limited particularly. The epoxy group-containing compound is preferably bisphenol A epoxy resin and bisphenol F epoxy resin, and more preferably bisphenol A epoxy resin. In the case where the epoxy group-containing compound is used in an excess amount for the preparation of the rubber-modified epoxy resin, the rubber-modified epoxy resin does not contain the unreacting and remaining epoxy group-containing compound after reaction.

The rubber-modified epoxy resin can be modified by preliminarily reacting bisphenol component. The amount of bisphenol component used for the modification is preferably 3 to 35 parts by mass, more preferably 5 to 25 parts by mass of 100 parts by mass of the rubber component of the rubber-modified epoxy resin. A cured product of a curable resin composition containing a modified rubber-modified epoxy resin has excellent adhesive durability after subjecting to high temperature and excellent impact resistance at lower temperature.

The glass transition temperature (Tg) of the rubber-modified epoxy resin is not limited particularly. The rubber-modified epoxy resin has the glass transition temperature of preferably −25° C. or less, more preferably −35° C. or less, even preferably −40° C. or less, and particularly preferably −50° C. or less.

The rubber modified epoxy resin has the number average molecular weight of preferably 1500 to 40000, more preferably 3000 to 30000, and particularly preferably 4000 to 20000 based on molecular weight of polystyrene measured by GPC. The distribution of the molecular weight of the rubber modified epoxy resin, that is, ratio of the weight average molecular weight to the number average molecular weight of the rubber modified epoxy resin is preferably 1 to 4, more preferably 1.2 to 3, and particularly preferably 1.5 to 2.5.

The amount of the rubber modified epoxy resin is preferably 1 to 50 parts by mass, more preferably 2 to 40 parts by mass, even preferably 5 to 30 parts by mass, and particularly preferably 10 to 20 parts by mass of 100 parts by mass of the epoxy resin (A). In the case of less than 1 part by mass, the cured product becomes fragile, adhesion to impact peeling is decreased in some cases. In the case of more than 50 parts by mass, the heat resistance and modulus (rigidity) of the cured product are lowered in some cases. The rubber modified epoxy resin can be used individually or in the combination of two or more kinds of the rubber modified epoxy resin.

<<Urethane Modified Epoxy Resin>>

The urethane-modified epoxy resin is a reaction product having 1.1 or more epoxy groups, preferably 2 or more epoxy groups on average per one molecule obtained by reacting a compound having a group having a reactiveness to an isocyanate group and an epoxy group, and a urethane prepolymer containing an isocyanate group. For example, the urethane-modified epoxy resin is obtained by reacting an epoxy compound having a hydroxyl group and a urethane prepolymer.

The urethane-modified epoxy resin has the number average molecular weight of preferably 1500 to 40000, more preferably 3000 to 30000, and particularly preferably 4000 to 20000 based on molecular weight of polystyrene measured by GPC. The distribution of the molecular weight of the urethane-modified epoxy resin, that is, ratio of the weight average molecular weight to the number average molecular weight of the urethane-modified epoxy resin is preferably 1 to 4, more preferably 1.2 to 3, and particularly preferably 1.5 to 2.5.

The amount of urethane modified epoxy resin is preferably 1 to 50 parts by mass, more preferably 2 to 40 parts by mass, even preferably 5 to 30 parts by mass, and particularly preferably 10 to 20 parts by mass of 100 parts by mass of the epoxy resin (A). In the case of less than 1 part by mass, the cured product becomes fragile, adhesion to impact peeling is decreased in some cases. In the case of more than 50 parts by mass, the heat resistance and modulus (rigidity) of the cured product are lowered in some cases. The urethane modified epoxy resin can be used individually or in the combination of two or more kinds of the urethane modified epoxy resin.

<Inorganic Filler>

Silicic acid and/or silicate as the inorganic filler can be added to the curable resin composition of the present invention. Concrete examples of inorganic filler include dry silica, wet silica, aluminum silicate, magnesium silicate, calcium silicate, wollastonite, talc and the like.

The dry silica is referred to as fumed silica, and include surface untreated hydrophilic fumed silica and hydrophobic fumed silica manufactured by chemically treating silanol group of the hydrophilic fumed silica with silane and siloxane. The hydrophobic fumed silica is preferred in the viewpoint of the dispersibility in the epoxy resin (A).

Other inorganic fillers include reinforcing fillers such as dolomite, and carbon black; fillers such as colloidal calcium carbonate, ground calcium carbonate, magnesium carbonate, titanium oxide, ferric oxide, aluminum fine powder, zinc oxide, active zinc flower, and the like. The inorganic fillers are preferably surface-treated with the surface treating agent. By the surface treatment, the dispersibility of the inorganic fillers into the composition is improved, and then various properties of the cured product are improved.

The amount of the inorganic fillers is preferably 1 to 100 parts by mass, more preferably 2 to 70 parts by mass, even preferably 5 to 40 parts by mass, and particularly preferably 7 to 20 parts by mass per 100 parts by mass of the epoxy resin (A). The inorganic fillers may be used individually or in the combination of two or more kinds of the inorganic fillers.

<Calcium Oxide>

In the curable resin composition of the present invention, calcium oxide may be added according to necessity. The calcium oxide removes water via a reaction with the water contained in the curable resin composition, so that it solves various problems of physical properties caused by the presence of water. For example, it functions as an antifoaming agent by removal of water and inhibits drop of adhesion strength.

Preferably, the calcium oxide can be surface-treated with a surface treatment agent. The surface treatment improves the dispersibility of the calcium oxide in the composition, so that the physical property such as adhesion strength of a cured product to be obtained are improved, compared with the case of using surface-untreated calcium oxide. Particularly, calcium oxide remarkably improves adhesion to T-peel and impact peel-resistant adhesion. The surface treating agent is not particularly limited, and the surface treating agent is preferably a fatty acid.

The amount of the calcium oxide to be used is preferably 0.1 to 10 parts by mass, more preferably 0.2 to 5 parts by mass, even preferably 0.5 to 3 parts by mass, and particularly preferably 1 to 2 parts by mass, relative to 100 parts by mass of the epoxy resin (A). If it is less than 0.1 parts by mass, the effect of removing water may not be sufficient, and if it is more than 10 parts by mass, the strength of a resulting cured product may be decreased. The calcium oxide may be used singly or two or more of the same may be used in combination.

<Radically Curable Resin>

In the present invention, a radically curable resin having at least two double bonds in the molecule may be used as required. If necessary, a low-molecular-weight compound having a molecular weight of less than 300 and having at least one double bond in the molecule may also be added. The low-molecular-weight compound can exhibit a function of modulating the viscosity of the composition, the properties of a cured product of the composition and the curing rate of the composition when used in combination with the radically curable resin, and therefore can act as a so-called reactive diluent for the radically curable resin. Furthermore, a radical polymerization initiator may also be added to the curable resin composition according to the present invention. In this regard, the radical polymerization initiator is preferably one of a latent type which can be activated when the temperature is increased (preferably to about 50° C. to about 150° C.)

Examples of the radically curable resin include an unsaturated polyester resin, polyester (meth)acrylate, epoxy (meth) acrylate, urethane (meth)acrylate, polyether (meth)acrylate, acrylated (meth)acrylate and the like. These radically curable resins may be used singly, or two or more of them may be used in combination. Specific examples of the radically curable resin include those compounds described in a pamphlet of WO 2014/115778. Specific examples of the low-molecular-weight compound and the radical polymerization initiator include those compounds described in a pamphlet of WO 2014/115778.

When the radical polymerization initiator is activated at a temperature different from the curing temperature for the epoxy resin as described in a pamphlet of WO 2010/019539, it becomes possible to partially cure the curable resin composition through the polymerization selective to the radically curable resin. This partial curing enables the increase in the viscosity of the composition after application of the composition and the improvement in wash-off resistance of the composition. In water-washing shower step in a production line for vehicles and the like, the adhesive agent composition which is not cured yet is often dissolved partially, scattered or deformed by the pressure of the showering water during the water-washing shower step to adversely affect the corrosion resistance of a part of a steel sheet on which the adhesive agent composition is applied or cause the deterioration in stiffness of the steel sheet. The term "wash-off resistance" means the resistance to this problem. The partial curing also enables the impartment of a function of temporarily fixing (temporarily adhering) substrates each other until the completion of the curing of the composition. In this case, it is preferred that the free radical initiator can be activated by heating to 80° C. to 130° C., and more preferably 100° C. to 120° C.

<Monoepoxide>

In the present invention, a monoepoxide may be used according to necessity. The monoepoxide may function as a reactive diluent. Specific examples of the monoepoxide include aliphatic glycidyl ethers such as butyl glycidyl ether, or aromatic glycidyl ethers such as phenyl glycidyl ether and cresyl glycidyl ether, ethers composed of an alkyl group having 8 to 10 carbon atoms and a glycidyl group, such as 2-ethylhexyl glycidyl ether, ethers composed of a glycidyl group and a phenyl group having 6 to 12 carbon atoms that may be substituted with an alkyl group having 2 to 8 carbon atoms, such as p-tert-buthylphenyl glycidyl ether, ethers composed of an alkyl group having 12 to 14 carbon atoms and a glycidyl group, such as dodecyl glycidyl ether; aliphatic glycidyl esters such as glycidyl (meth)acrylate and glycidyl maleate; glycidyl esters of aliphatic carboxylic acids having 8 to 12 carbon atoms, such as glycidyl versatate, glycidyl neodecanoate, and glycidyl laurate; and glycidyl p-t-butylbenzoate.

When a monoepoxide is used, its amount to be used is preferably 0.1 to 20 parts by mass, more preferably 0.5 to 10 parts by mass, and particularly preferably 1 to 5 parts by mass, per 100 parts by mass of the epoxy resin (A). If it is less than 0.1 parts by mass, the effect of lowering viscosity may not be sufficient, and if it is more than 20 parts by mass, physical properties such as adhesion properties may be deteriorated.

<Photopolymerization Initiator>

When the curable resin composition of the present invention is photo-cured, a photopolymerization initiator may be added thereto. Examples of such a photopolymerization initiator include aromatic sulfonium salts with anions such as hexafluoroantimonate, hexafluorophosphate, and tetraphenyl borate, onium salts such as aromatic iodonium salts, and photocationic polymerization initiators (photoacid generators) such as aromatic diazonium salts and metallocene salts. Such photopolymerization initiators may be used singly or two or more of the same may be used in combination.

<Other Components>

In the present invention, other components may be used according to necessity. Examples of such other components include expanding agents such as azo-type chemical foaming agents and thermally expandable microballoons, fiber pulps such as aramidpulp, coloring agents, such as pigments and dyes, extender pigments, UV absorbers, antioxidants, stabilizers (anti-gelling agents), plasticizers, leveling agents, defoaming agents, silane coupling agents, antistatic agents, flame retardants, lubricants, thinners, low profile additives, organic fillers, thermoplastic resins, desiccants, and dispersing agents.

<Method for Preparing Curable Resin Composition>

The curable resin composition of the present invention is a composition containing polymer fine particles (B) in the curable resin composition containing the epoxy resin (A) as a main component. The curable resin composition is preferably a composition in which the polymer fine particles (B) are dispersed at the state of primary particle.

Various methods can be used as a method of obtaining a composition in which polymer fine particles (B) are dispersed in the state of primary particles in the epoxy resin (A). For example, such a method includes a method of bringing polymer fine particles obtained in the state of an aqueous latex, into contact with the epoxy resin (A) and then removing unnecessary components such as water and the like, and a method of once extracting polymer fine particles with an organic solvent and then mixing the extract with the epoxy resin (A) to remove the organic solvent. However, it is preferred to use the method described in WO 2005/028546. Specifically, such a method includes a first step of mixing an aqueous latex containing polymer fine particles (B) (in particular, a reaction mixture after production of the polymer fine particles by emulsion polymerization) with an organic solvent having a solubility of 5% by mass or more and 40% by mass or less in water at 20° C. and further mixing the mixture with an excess of water to agglomerate the polymer fine particles; a second step of separating and collecting the agglomerated polymer fine particles (B) from the liquid phase and mixing the polymer fine particles with an organic solvent again to obtain an organic solvent solution containing the polymer fine particles (B); and a third step of further mixing the organic solvent solution with the epoxy resin (A) and then distilling off the organic solvent, and this method is preferably used for the preparation of the composition.

The epoxy resin (A) is preferably a liquid at 23° C. because the third step is easily performed. The term "liquid at 23° C." means that the softening point is 23° C. or less and means that the epoxy resin (A) has a fluidity at 23° C.

By additionally mixing the epoxy resin (A), the inorganic filler (C), epoxy curing agent (D), and curing accelerator (E) and the above-described other components according to necessity with the composition obtained via the above-described steps in which the polymer fine particles (B) are dispersed in a primary particle state in the epoxy resin (A), a curable resin composition of the present invention in which the polymer fine particles (B) are dispersed in a primary particle state is obtained.

On the other hand, powdery polymer fine particles (B) obtained by drying after coagulation by such a method as salting-out can be re-dispersed in the epoxy resin (A) by using a disperser having high mechanical shearing force, such as a three-roll paint mill, a roll mill, and a kneader. In this case, the epoxy resin (A) and the polymer fine particle (B) render the dispersion of the polymer fine particle (B) possible efficiently by being given a mechanical shearing force at high temperatures. The temperature at which the dispersion is performed is preferably 50 to 200° C., more preferably 70 to 170° C., even more preferably 80 to 150° C., and particularly preferably 90 to 120° C. If the temperature is lower than 50° C., the polymer fine particle (B) may not be sufficiently dispersed, and if the temperature is higher than 200° C., the epoxy resin (A) and the polymer fine particle (B) may be thermally degraded.

The curable resin composition of the present invention can be used in the form of a one-pack type curable resin composition that is sealed and stored after mixing all components in advance, and is cured by heating or light irradiation after application thereof. It is also allowed to prepare a two-pack or multi-pack curable resin composition composed of a liquid A containing the epoxy resin (A) as the major component, the polymer fine particles (B), and according to necessity, the blocked urethane (C), and a separately prepared liquid B containing the epoxy curing agent (D), the curing accelerator (E), and according to necessity, the polymer fine particles (B) and/or the blocked urethane (C), and to mix the liquid A and the liquid B before use and then use the mixture. Since the curable resin composition of the present invention excels in storage stability, it is particularly beneficial when it is used as a one-pack type curable resin composition. The polymer fine particles (B) and the blocked urethane (C) are just required to be contained in at least one of the liquid A and the liquid B: for example, they may be contained only in the liquid A or only in the liquid B or they may be contained in both the liquid A and the liquid B.

<Cured Product>

The present invention encompasses a cured product produced by curing the curable resin composition. In the case of a curable resin composition in which polymer fine particles are dispersed in the form of primary particles, a cured product in which the polymer fine particles are dispersed homogeneously can be produced readily by curing the curable resin composition. In this case, since the polymer fine particles are hardly swelled and the viscosity of the curable resin composition is low, the cured product can be produced with good workability.

<Method for Application>

The curable resin composition according to the present invention can be applied by any method. The resin composition can be applied at a temperature as low as room temperature, and can also be applied while being heated if necessary. The curable resin composition of the present invention is particularly useful for methods of coating the composition by heating the composition due to excellent storage stability.

The curable resin composition according to the present invention may be extruded in a bead-like, monofilament-like or swirl-like form on a substrate using an application robot, or may be applied employing a mechanical application method using a caulking gun or the like or other manual application means. Alternatively, the composition may be applied onto a substrate by a jet spray method or a streaming method. The curable resin composition according to the present invention is applied onto one or both of two substrates and the substrates are brought into contact with each other in such a manner that the composition is arranged between the substrates to be bonded each other, and then the resin composition is cured to bond the substrates each other. The viscosity of the curable resin composition is not particularly limited, and the viscosity of the curable resin composition in the extruded bead method is preferably 150 to 600 Pa·s at 45° C., and the viscosity of the curable resin composition in the swirl coating method is preferably 100 Pa·s at 45° C., and the viscosity of the curable resin composition in method for coating the composition at high volume using the high speed flow device is preferably 20 to 400 Pa·s at 45° C.

When it is intended to use the curable resin composition according to the present invention as an adhesive for vehicle, for the purpose of improving the above-mentioned "wash-off resistance", it is effective to increase the viscosity of the composition. The curable resin composition according to the present invention is preferred, because the curable resin composition has high thixotropic properties and therefore tends to have a high viscosity. The viscosity of the highly viscous composition can be adjusted to a value at which the composition can be applied by heating.

Furthermore, for the purpose of improving the "wash-off resistance," it is preferred to add to the composition a polymeric compound having a crystalline melting point around a temperature at which the curable composition according to the present invention is to be applied, as described in a pamphlet of WO 2005/118734. The viscosity of the composition is low (easy to apply) at a temperature at which the composition is to be applied, and is high at a temperature at which the water-washing shower step is to be carried out, and therefore the "wash-off resistance" of the composition is improved. Examples of the polymeric compound having a crystalline melting point around a temperature at which the composition is to be applied include various polyester resins including a crystalline or semi-crystalline polyester polyol.

In addition, as another method for improving the "wash-off resistance" of the composition, a method can be mentioned, in which the curable resin composition is prepared in the form of a two-pack preparation, a curing agent capable of curing at room temperature (e.g., an amine curing agent having an amino group or an imino group) is used in a small amount as the curing agent, and a latent curing agent that can exhibit the activity thereof at a higher temperature (e.g., dicyandiamide) is also used in combination, as described in a pamphlet of WO 2006/093949. When at least two types of curing agents having greatly different curing temperatures are used in combination, the partial curing of the composition proceeds immediately after the application of the composition, and the viscosity of the composition becomes high at a time at which the water-washing shower step is carried out, thereby improving the "wash-off resistance" of the composition.

After curing the curable resin composition, the dynamic resistance to cleavage is preferably more than 19 kN/m, and more preferably 20 kN/m or more. The upper limit of the dynamic resistance to cleavage is not limited particularly, and for example is 100 kN/m. The dynamic resistance to cleavage can be evaluated according to ISO 11343. A viscosity at 50° C. of the curable resin composition is, for example, 1 to 500 Pa·s, preferably 5 to 300 Pa·s, more preferably 10 to 200 Pa·s, and even preferably 20 to 100 Pa·s.

<Substrate to be Adhered>

When it is intended to bond various types of substrates each other using the resin composition according to the present invention, for example, woody materials, metals, plastic materials, and glass materials can be bonded. The bonding of automotive parts to each other is preferred, and the bonding of automotive frames to each other and the bonding of an automotive frame to another automotive part is more preferred. Examples of the substrate include steel materials including cold-rolling steel and hot-dip zinc-coated steel, aluminum materials including aluminum and coated aluminum, and various types of plastic substrates including a general-purpose plastic, engineering plastic and a composite material such as CFRP, GFRP, and the like.

The curable resin composition according to the present invention has excellent adhesion such as dynamic resistance to cleavage. A laminate bonded with multiple members may be obtained by sandwiching the curable resin composition of the present invention between multiples members including alminium substrate to laminate these, and curing the curable resin composition. The laminate indicates high adhesion strength. The curable resin composition according to the present invention is suitable for the bonding of different substrates having different linear expansion coefficients to each other due to excellent toughness.

The curable resin composition according to the present invention can also be used for the bonding of aerospace constituent materials to each other, particularly the bonding of exterior metallic constituent materials to each other.

<Curing Temperature>

The curing temperature for the curable resin composition according to the present invention is not limited particularly. When the resin composition is used as a one-pack curable resin composition, the curing temperature is preferably 50° C. to 250° C., more preferably 80° C. to 220° C., still more preferably 100° C. to 200° C., and particularly preferably 130° C. to 180° C. When the resin composition is used as a two-pack curable resin composition, the curing temperature is not particularly limited, and is preferably 0° C. to 150° C., more preferably 10° C. to 100° C., even preferably 15° C. to 80° C., and particularly preferably 20° C. to 60° C.

When the curable resin composition according to the present invention is used as an adhesive for automobiles, it is preferred to apply the adhesive to an automotive member, then apply a coating material onto the automotive member, and then cure the adhesive simultaneously with the baking/curing of the coating material, from the viewpoint of the shortening and simplification of the process.

<Use Applications>

The curable resin composition of the present invention is preferably one-pack curable resin composition in the viewpoint of the handling.

The curable resin composition according to the present invention can be used suitably as a structural adhesive for vehicle and aerospace structures, an adhesive for wind power-generating structures, a paint, a laminate material using glass fiber, a material for printed wiring substrates, a solder resist, an interlayer insulating film, a build-up material, an adhesive for FPCs, an electrically insulating material including a sealing material for electronic components such as semiconductors and LEDs, a die bonding material, an underfill, a semiconductor packaging material for ACF, ACP, NCF, NCP and the like, a sealing material such as a sealing material for display devices and lighting devices including a liquid crystal panel, an OLED lighting devices and an OLED display. Particularly, the curable resin composition of the present invention is useful for the structural adhesive for vehicle.

The present application claims the benefits of priority to Japanese Patent Application Number 2015-080397 filed on Apr. 9, 2015. The entire contents of the specification of Japanese Patent Application Number 2015-080397 filed on Apr. 9, 2015 are hereby incorporated by reference.

EXAMPLES

Next, the present invention will be described in detail with reference to Examples and Comparative Examples, but the present invention is not limited thereto, and the variation and the modification of the present invention without departing the gist described above and below are all included the technical scope of the present invention. In the following Examples and Comparative Examples, "part(s)" and "%" mean "part(s) by mass" and "% by mass", respectively.

Evaluation Method

First, the evaluation method of the curable resin composition produced by Examples and Comparative Examples will be described below.

[1] Measurement of Volume Average Particle Diameter

The volume average particle diameters (Mv) of the polymer fine particles dispersing in the aqueous latex were determined using Microtrac UPA 150 (manufactured by Nikkiso Co., Ltd.). A solution prepared by diluting the aqueous latex with deionized water was used as a measurement sample. The measurement was carried out in such a manner that the refractive index of water and the refractive index of each of polymer fine particles were input, the time of measurement was 600 seconds, and the concentration of the sample was adjusted so that the signal level fell within the range from 0.6 to 0.8.

1. Formation of Core Layer

Production Example 1-1; Preparation of Polybutadiene Rubber Latex (R-1)

Into a pressure resistant polymerization reactor, 200 parts by mass of deionized water, 0.03 parts by mass of tripotassium phosphate, 0.002 parts by mass of disodium ethylenediaminetetraacetate (EDTA), 0.001 parts by mass of ferrous sulfate heptahydrate (FE) and 1.55 parts by mass of sodium dodecylbenzenesulfonate (SDS) were charged, and stirred while sufficient nitrogen purge was performed to remove oxygen. Then, 99.6 parts by mass of butadiene (BD) and 0.4 parts by mass of t-dodecyl mercaptan was fed to the system, and the mixture was heated to 45° C. To this, 0.03 parts by mass of paramenthane hydroperoxide (PHP) and subsequently 0.10 parts by mass of sodium formaldehyde sulfoxylate (SFS) were added to initiate polymerization. Additionally, 0.025 parts by mass of PHP were charged at the time of 3, 5, and 7 hours from the start of the polymerization, 0.0006 parts by mass of EDTA, and 0.003 parts by mass of FE were charged at the time of 4, 6, and 8 hours from the start of the polymerization. At the time of 15 hours from the start of the polymerization, remaining monomers were distilled off and removed under reduced pressure to stop the polymerization, so that a latex (R-1) containing polybutadiene rubber particles as a main component was obtained. The volume average particle diameter of the polybutadiene rubber particles contained in the resulting latex was 0.08 µm.

Production Example 1-2; Preparation of Polybutadiene Rubber Latex (R-2)

Into a pressure resistant polymerization reactor, 21 parts by mass of the polybutadiene rubber latex (R-1) (containing 7 parts by mass of polybutadiene rubber) prepared in Production Example 1-1, 185 parts by mass of deionized water, 0.03 parts by mass of tripotassium phosphate, 0.002 parts by mass of EDTA, 0.001 parts by mass of ferrous sulfate heptahydrate were charged, and stirred while sufficient nitrogen purge was performed to remove oxygen. Then, 93 parts by mass of butadiene (BD) was fed to the system, and the mixture was heated to 45° C. To this, 0.02 parts by mass of PHP and subsequently 0.10 parts by mass of SFS were added to initiate polymerization. Additionally, 0.025 parts by mass of PHP, 0.0006 parts by mass of EDTA, and 0.003 parts by mass of FE were charged at the time of every 3 hours from the start of the polymerization to 24 hours. At the time of 30 hours from the start of the polymerization, remaining monomers were distilled off and removed under reduced pressure to stop the polymerization, so that a latex (R-2) containing polybutadiene rubber particles as a main component was obtained. The volume average particle diameter of the polybutadiene rubber particles contained in the resulting latex was 0.20 µm.

2. Preparation of Polymer Fine Particles (Formation of Shell Layer)

Production Example 2-1; Preparation of Core-Shell Polymer Latex (L-1)

Into a glass container having a thermometer, an agitator, a reflux condenser, a nitrogen inlet, and a device of adding a monomer, 241 parts by mass of the latex (R-1) obtained in Production Example 1-2 (containing 80 parts by mass of polybutadiene rubber particles) and 71 parts by mass of deionized water were charged, and stirred at 60° C. while nitrogen purge was performed. After 0.004 parts by mass of EDTA, 0.001 parts by mass of FE, and 0.2 parts by mass of SFS were added, graft polymerization was performed by adding a mixture of a graft monomer (17 parts by mass of methyl methacrylate (MMA), 2 parts by mass of styrene (ST), 1 part by mass of 4-hydroxybutyl acrylate (4HBA)) and 0.06 parts by mass of cumene hydroperoxide (CHP) continuously over 2 hours. After the completion of the addition, 0.04 parts by mass of CHP was added thereto, the mixture was further stirred for 2 hours to complete the reaction and an aqueous latex (L-1) of a core-shell polymer was obtained. A polymerization conversion rate of a monomer was 99% or more. The volume average particle diameter of the core-shell polymer contained in the resulting latex was 0.21 µm.

Production Example 2-2: Preparation of Core-Shell Polymer Latex (L-2)

The same procedure as in Production Example 2-1 was carried out, except that 14 parts by mass of methyl methacrylate (MMA), 2 parts by mass of styrene (St), 4 parts by mass of 4-hydroxybutyl acrylate (4HBA) were used in place of 17 parts by mass of methyl methacrylate (MMA), 2 parts by mass of styrene (St), 1 part by mass of 4-hydroxybutyl acrylate (4HBA). In this manner, aqueous latex (L-2) containing core-shell polymer was produced. The core-shell polymer contained in the aqueous latex had a volume average particle diameter of 0.21 µm.

Production Example 2-3: Preparation of Core-Shell Polymer Latex (L-3)

The same procedure as in Production Example 2-1 was carried out, except that 18 parts by mass of methyl methacrylate (MMA), 2 parts by mass of styrene (St) were used in place of 17 parts by mass of methyl methacrylate (MMA), 2 parts by mass of styrene (St), 1 part by mass of 4-hydroxybutyl acrylate (4HBA). In this manner, aqueous latex (L-3) containing core-shell polymer was produced. The core-shell polymer contained in the aqueous latex had a volume average particle diameter of 0.21 µm.

Production Example 2-4: Preparation of Core-Shell Polymer Latex (L-4)

The same procedure as in Production Example 2-1 was carried out, except that 15 parts by mass of methyl methacrylate (MMA), 3 parts by mass of styrene (St), 2 parts by mass of 4-hydroxybutyl acrylate (4HBA) were used in place of 17 parts by mass of methyl methacrylate (MMA), 2 parts by mass of styrene (St), 1 part by mass of 4-hydroxybutyl acrylate (4HBA). In this manner, aqueous latex (L-4) containing core-shell polymer was produced. The core-shell polymer contained in the aqueous latex had a volume average particle diameter of 0.21 µm.

Production Example 2-5: Preparation of Core-Shell Polymer Latex (L-5)

The same procedure as in Production Example 2-1 was carried out, except that 13 parts by mass of methyl methacrylate (MMA), 3 parts by mass of styrene (St), 4 parts by mass of 4-hydroxybutyl acrylate (4HBA) were used in place of 17 parts by mass of methyl methacrylate (MMA), 2 parts by mass of styrene (St), 1 part by mass of 4-hydroxybutyl acrylate (4HBA). In this manner, aqueous latex (L-5) containing core-shell polymer was produced. The core-shell polymer contained in the aqueous latex had a volume average particle diameter of 0.21 µm.

Production Example 2-6: Preparation of Core-Shell Polymer Latex (L-6)

The same procedure as in Production Example 2-1 was carried out, except that 11 parts by mass of methyl methacrylate (MMA), 3 parts by mass of styrene (St), 6 parts by mass of 4-hydroxybutyl acrylate (4HBA) were used in place of 17 parts by mass of methyl methacrylate (MMA), 2 parts by mass of styrene (St), 1 part by mass of 4-hydroxybutyl acrylate (4HBA). In this manner, aqueous latex (L-6) containing core-shell polymer was produced. The core-shell polymer contained in the aqueous latex had a volume average particle diameter of 0.21 µm.

Production Example 2-7: Preparation of Core-Shell Polymer Latex (L-7)

The same procedure as in Production Example 2-1 was carried out, except that 17 parts by mass of methyl methacrylate (MMA), 3 parts by mass of styrene (St) were used in place of 17 parts by mass of methyl methacrylate (MMA), 2 parts by mass of styrene (St), 1 part by mass of 4-hydroxybutyl acrylate (4HBA). In this manner, aqueous latex (L-7) containing core-shell polymer was produced. The core-shell polymer contained in the aqueous latex had a volume average particle diameter of 0.21 µm.

3. Preparation of Dispersion (M) in which Polymer Fine Particles (B) are Dispersed in Curable Resin Production Example 3-1; Preparation of Dispersion (M-1)

Into a 1-L stirring tank kept at 25° C., 132 g of methyl ethyl ketone (MEK) was charged, and then 132 g (corresponding to 40 g of polymer fine particles) of the aqueous latex (L-1) of the core-shell polymer obtained in the above-described Production Example 2-1 was also charged under stirring. After mixing uniformly, 200 g of water was added at a feeding rate of 80 g/min. Immediately after the completion of the addition, stirring was stopped and thus a slurry composed of buoyant aggregates and an aqueous phase containing an organic solvent was obtained. Subsequently, 360 g of the aqueous phase was discharged through a discharge port at a lower portion of the tank while the aggregates containing some aqueous phase were left. To the resulting aggregates, 90 g of MEK was added and mixed uniformly to obtain a dispersion in which core-shell polymers were dispersed uniformly. To this dispersion was mixed 120 g of an epoxy resin (A-1: produced by Mitsubishi Chemical Corporation, JER 828: liquid bisphenol A epoxy resin) as an epoxy resin (A). MEK was removed from the mixture by using a rotary evaporator. Thus, a dispersion (M-1) in which polymer fine particles were dispersed in an epoxy resin was obtained.

Production Example 3-2; Preparation of Dispersion (M-2)

A dispersion (M-2) in which polymer fine particles were dispersed in an epoxy resin was obtained in the same manner as Production Example 3-1 except that the aqueous latex (L-2) was used in place of the aqueous latex (L-1) of the core-shell polymer.

Production Example 3-3; Preparation of Dispersion (M-3)

A dispersion (M-3) in which polymer fine particles were dispersed in an epoxy resin was obtained in the same manner as Production Example 3-1 except that the aqueous latex (L-3) was used in place of the aqueous latex (L-1) of the core-shell polymer.

Production Examples 3-4 to 7; Preparation of Dispersions (M-4 to 7)

Dispersions (M-4 to 7) in which polymer fine particles were dispersed in an epoxy resin was obtained in the same manner as Production Example 3-1 except that each of the aqueous latexes (L-4 to 7) obtained in the Production Examples 2-4 to 7 was used in place of the aqueous latex (L-1) of the core-shell polymer, and 93.3 g of the epoxy resin (A) was mixed in place of 120 g of the epoxy resin (A-1).

Examples 1 to 3 and Comparative Examples 1 to 8

The curable resin compositions were prepared by weighing each components according to the formulation of Table 1 and sufficiently mixing components.

The resistance to dynamic cleavage of each of the compositions of Table 1 was measured by the following method. Results are shown in Table 1.

<Dynamic Resistance to Cleavage (Impact Peel-Resistant Adhesion)>

A curable resin composition was applied to two SPCC steel plates, the plates were stacked to have an adhesive layer thickness of 0.25 mm, followed by curing at 170° C. for 25 minutes, and then dynamic resistance to cleavage at 23° C. was measured according to ISO 11343. The test results are shown in Table 1. Additionally, the following components were used as each of compounding agents given in Table 1.

<Epoxy Resin (A)>

A-1: JER (registered trademark) 828 (manufactured by Mitsubishi chemical corporation, liquid bisphenol A epoxy resin at ambient temperature, epoxy equivalent: 184 to 194)

A-2: YED216 (manufactured by Mitsubishi Chemical Corporation, 1,6-hexanediol diglycidyl ether, epoxy equivalent: 110 to 130))

<Dispersion (M) in which Polymer Fine Particles (B) are Dispersed in Epoxy Resin (A)>

M-1 to 3: dispersions obtained in the Production Examples 3-1 to 3-3.

<Blocked Urethane (C)>

C-1: QR-9466 (manufactured by ADEKA CORPORATION, blocked urethane containing polypropylene glycol structure, blocked NCO equivalent 1400, viscosity 25000 mPa·s at 25° C.)

C-2: Flexibilizer DY 965 (manufactured by HUNTSMAN CORPORATION, blocked urethane containing polytetramethylene glycol structure, viscosity 4400 to 12800 cP at 25° C.)

<<Rubber Modified Epoxy Resin>>

Hypox (registered trademark) RA 1340 (manufactured by CVC Thermoset Specialties, rubber modified epoxy resin: 40% by weight, bisphenol A epoxy resin: 60% by weight, epoxy equivalent: 325 to 375)

<<Urethane Modified Epoxy Resin>>

EPU-73B (manufactured by ADEKA CORPORATION, urethane modified epoxy resin: 40% by weight, bisphenol A epoxy resin concentration: 60% by weight, epoxy equivalent: 245)

<<Fumed Silica>>

CAB-O-SIL TS-720 (produced by Cabot Corporation, fumed silica surface-treated with polydimethylsiloxane)

<<Ground Calcium Carbonate>>
WHITON SB Red (produced by Shiraishi Calcium Kaisha, Ltd., surface-untreated ground calcium carbonate, average particle diameter: 1.8 μm)
<<Calcium Oxide>>
CML#31 (produced by Ohmi Chemical Industry Co., Ltd., calcium oxide surface-treated with a fatty acid)
<<Carbon Black>>
MONARCH 280 (produced by Cabot Corporation)
<Epoxy Curing Agent (D)>
Dyhard (registered trademark) 100S (manufactured by AlzChem AG, dicyandiamide)
<Curing Accelerator (E)>
Dyhard (registered trademark)UR300 (produced by AlzChem AG, 1,1-dimethyl-3-phenylurea)

2 and mixing components. The dynamic resistance to cleavage and the viscosity of each of the compositions of Table 2 were measured by the following method. Results are shown in Table 2.

<Viscosity>

The viscosity of the curable resin composition was measured with digital viscometer DV-II+ Pro Type manufactured by Brookfield. Each of viscosities at 50° C. was measured by using spindle CPE-52 under condition that shear rate was 2 (s$^{-1}$).

<Dynamic Resistance to Cleavage (Impact Peel-Resistant Adhesion)>

A curable resin composition was applied to two SPCC steel plates, the plates were stacked to have an adhesive

TABLE 1

| | Composition(part by mass) | | | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|---|---|
| (A) | Epoxy resin | | A-1 | 25 | 25 | 25 | 25 | 25 | 100 | 25 | 10 | 10 | 10 | 10 |
| | | | A-2 | 5 | 5 | 5 | 5 | 5 | 5 | 5 | 5 | 5 | 5 | 5 |
| (A) + | Dispersion in which polymer fine | 0.07 (*) | M-1 | 100 | | | 100 | | | 100 | | | | |
| (B) | particles (B) are dispersed in | 0.28 (*) | M-2 | | 100 | 100 | | 100 | | | | 100 | | 100 |
| | epoxy resin (A) Polymer fine particles of 25% by mass | 0 (*) | M-3 | | | | | | | | 100 | | 100 | |
| (C) | Blocked urethane | | C-1 | 15 | 15 | | | | 40 | 15 | | | | |
| | | | C-2 | | | 15 | | | | | | | | |
| | Rubber modified epoxy resin (containing component (A)) | Hypox RA 1340 | | | | | | | | | 25 | 25 | 25 | |
| | Urethane modified epoxy resin (containing component (A)) | EPU-73B | | | | | | | | | | | | 25 |
| | Fumed silica | TS-720 | | 3 | 3 | 3 | 3 | 3 | 3 | 3 | 3 | 3 | 3 | 3 |
| | Ground calcium carbonate | Whiton SB | | 15 | 15 | 15 | 15 | 15 | 15 | 15 | 15 | 15 | 15 | 15 |
| | Calcium oxide | CML#31 | | 1.5 | 1.5 | 1.5 | 1.5 | 1.5 | 1.5 | 1.5 | 1.5 | 1.5 | 1.5 | 1.5 |
| | Carbon black | MONARCH 280 | | 0.3 | 0.3 | 0.3 | 0.3 | 0.3 | 0.3 | 0.3 | 0.3 | 0.3 | 0.3 | 0.3 |
| (D) | Epoxy curing agent | Dyhard 100S | | 7 | 7 | 7 | 7 | 7 | 7 | 7 | 7 | 7 | 7 | 7 |
| (E) | Curing accelerator | Dyhard UR300 | | 1 | 1 | 1 | 1 | 1 | 1 | 1 | 1 | 1 | 1 | 1 |
| Amount of component (B) to 100 parts of component (A) (parts by mass) | | | | 24 parts | 24 parts | 24 parts | 24 parts | 24 parts | 0 parts | 24 parts | 24 parts | 24 parts | 24 parts | 24 parts |
| Amount of component (C) to 100 parts of component (A) (parts by mass) | | | | 14 parts | 14 parts | 14 parts | 0 parts | 0 parts | 38 parts | 14 parts | 0 parts | 0 parts | 0 parts | 0 parts |
| Amount of component (D) to 100 parts of component (A) (parts by mass) | | | | 6.7 parts | 6.7 parts | 6.7 parts | 6.7 parts | 6.7 parts | 6.7 parts | 6.7 parts | 6.7 parts | 6.7 parts | 6.7 parts | 6.7 parts |
| Amount of component (E) to 100 parts of component (A) (parts by mass) | | | | 1.0 part | 1.0 part | 1.0 part | 1.0 part | 1.0 part | 1.0 part | 1.0 part | 1.0 part | 1.0 part | 1.0 part | 1.0 part |
| Dynamic resistance to cleavage (kN/m), adherend: steel sheet | | | | 21 | 21 | 20 | 12 | 13 | 4 | 18 | 17 | 17 | 16 | 11 |

(*) Content of hydroxyl group of polymer fine particles, (mmol/g)

From results of Table 1, in Examples 1 to 3, curable resin compositions containing the epoxy resin (A), the polymer fine particles (B), and the blocked urethane (C) have excellent impact peel-resistant adhesion. The amount of the epoxy resin (A) contained in the curable resin composition of Table 1 is a total amount of a component added as the epoxy resin, a component contained in dispersion (M) including the polymer fine particles, and a component contained in the rubber modified epoxy resin or urethane modified epoxy resin. The polymer fine particles of the present invention mean polymer fine particles satisfying a given content of a hydroxyl group.

Examples 4 to 6 and Comparative Example 9

The curable resin compositions were prepared by weighing each components according to the formulation of Table layer thickness of 0.25 mm, followed by curing at 170° C. for 1 hour, and then dynamic resistance to cleavage at 23° C. was measured according to ISO 11343.

The following agents were used as formulating agents other than the above components.

<Epoxy Resin (A)>

A-3: Epolight 400P (manufactured by KYOEISHA CHEMICAL CO., LTD, polypropylene glycol diglycidylether, epoxy equivalent: 300 to 330)

<Dispersion (M) in which Polymer Fine Particles (B) are Dispersed in Epoxy Resin (A)>

M-4 to 7: dispersions obtained in the above Production Examples 3-4 to 7

TABLE 2

| Composition(part by mass) | | | Example | | | Comparative Example |
|---|---|---|---|---|---|---|
| | | | 4 | 5 | 6 | 9 |
| (A) | Epoxy resin | A-1 | 30 | 30 | 30 | 30 |
| | | A-3 | 5 | 5 | 5 | 5 |
| (A) + (B) | Dispersion in which polymer fine particles 0.14 (*) | M-4 | 100 | | | |
| | (B) are dispersed in epoxy resin (A) 0.28 (*) | M-5 | | 100 | | |
| | Polymer fine particles of 30% by mass 0.42 (*) | M-6 | | | 100 | |
| | 0 (*) | M-7 | | | | 100 |
| (C) | Blocked urethane | C-2 | 10 | 10 | 10 | 10 |
| | Fumed silica | TS-720 | 3 | 3 | 3 | 3 |
| | Ground calcium carbonate | Whiton SB | 15 | 15 | 15 | 15 |
| | Calcium oxide | CML#31 | 1.5 | 1.5 | 1.5 | 1.5 |
| | Carbon black | MONARCH 280 | 0.3 | 0.3 | 0.3 | 0.3 |
| (D) | Epoxy curing agent | Dyhard 100S | 7 | 7 | 7 | 7 |
| (E) | Curing accelerator | Dyhard UR300 | 1 | 1 | 1 | 1 |
| Amount of component (B) to 100 parts of component (A) (parts by mass) | | | 29 parts | 29 parts | 29 parts | 29 parts |
| Amount of component (C) to 100 parts of component (A) (parts by mass) | | | 10 parts | 10 parts | 10 parts | 10 parts |
| Amount of component (D) to 100 parts of component (A) (parts by mass) | | | 6.7 parts | 6.7 parts | 6.7 parts | 6.7 parts |
| Amount of component (E) to 100 parts of component (A) (parts by mass) | | | 1.0 part | 1.0 part | 1.0 part | 1.0 part |
| Viscosity at 50° C. of Composition(Pa · s) | | | 29 | 46 | 352 | 33 |
| Dynamic resistance to cleavage (kN/m), adherend: steel sheet | | | 38 | 43 | 43 | 19 |

(*) Content of hydroxyl group of polymer fine particles, (mmol/g)

From results of Table 2, in Examples 4 to 6, curable resin compositions containing the epoxy resin (A), the polymer fine particles (B), and the blocked urethane (C) have excellent impact peel-resistant adhesion. Especially, curable resin compositions of Examples 4 and 5 were relatively lower viscosity and good workability. The amount of the epoxy resin (A) contained in the curable resin composition of Table 2 is a total amount of a component added as the epoxy resin, a component contained in dispersion (M) including the polymer fine particles, and a component contained in the rubber modified epoxy resin or urethane modified epoxy resin. The polymer fine particles (B) of the present invention mean polymer fine particles satisfying a given content of a hydroxyl group.

The invention claimed is:

1. A curable resin composition comprising 100 parts by mass of an epoxy resin (A), 1 to 100 parts by mass of polymer fine particles (B), and 1 to 100 parts by mass of a blocked urethane (C), wherein the polymer fine particles have a core-shell structure of a core layer and a shell layer, the core layer comprises diene rubber, the shell layer comprises at least a hydroxyl group, and the content of the hydroxyl group of the polymer fine particles (B) is 0.01 to 0.8 mmol/g.

2. The curable resin composition according to claim 1, wherein the polymer fine particles (B) have the shell layer graft-polymerized on the core layer, and the shell layer is polymerized with a monomer having a hydroxyl group and at least one monomer selected from the group consisting of an aromatic vinyl monomer, a vinyl cyanide monomer, and a (meth)acrylate monomer.

3. The curable resin composition according to claim 1, wherein the diene rubber is butadiene rubber and/or butadiene-styrene rubber.

4. The curable resin composition according to claim 1, wherein the blocked urethane (C) comprises a compound including a urethane prepolymer having a polyalkylene glycol structure capped with a blocking agent.

5. The curable resin composition according to claim 1, wherein a mass ratio of polymer fine particles (B) to blocked urethane (C) is 0.2 to 5.

6. The curable resin composition according to claim 1, wherein the epoxy resin (A) comprises a reactive diluent of a polyepoxide, and the amount of the reactive diluent is 0.5 to 20% by mass per 100% by mass of the epoxy resin (A).

7. The curable resin composition according to claim 1, wherein the content of the hydroxyl group of the polymer fine particles (B) is 0.01 to 0.4 mmol/g.

8. The curable resin composition according to claim 1, wherein an epoxy curing agent (D) is contained in an amount of 1 to 80 parts by mass per 100 parts by mass of the epoxy resin (A).

9. The curable resin composition according to claim 1, wherein a curing accelerator (E) is contained in an amount of 0.1 to 10 parts by mass per 100 parts by mass of the epoxy resin (A).

10. The curable resin composition according to claim 1, wherein the polymer fine particles (B) are dispersed at a state of primary particles in the curable resin composition.

11. The curable resin composition according to claim 1, wherein dynamic resistance to cleavage is more than 19 kN/m after curing the curable resin composition.

12. A cured product obtained by curing the curable resin composition as defined in claim 1.

13. A one pack curable resin composition comprising the curable resin composition as defined in claim 1.

14. A structural adhesive containing the curable resin composition as defined in claim 1.

15. The curable resin composition according to claim 2, wherein the diene rubber is butadiene rubber and/or butadiene-styrene rubber.

16. The curable resin composition according to claim 2, wherein the blocked urethane (C) comprises a compound including a urethane prepolymer having a polyalkylene glycol structure capped with a blocking agent.

17. The curable resin composition according to claim 3, wherein the blocked urethane (C) comprises a compound including a urethane prepolymer having a polyalkylene glycol structure capped with a blocking agent.

18. The curable resin composition according to claim 4, wherein the blocked urethane (C) comprises a compound including a urethane prepolymer having a polypropylene glycol structure or a polytetramethylene glycol structure capped with a blocking agent.

* * * * *